United States Patent
Mochida et al.

(12) 
(10) Patent No.: US 6,462,744 B1
(45) Date of Patent: Oct. 8, 2002

(54) IMAGE DECODING APPARATUS THAT PERFORMS IMAGE DECODING SO THAT FRAME AREAS THAT OCCUPY A LARGE AREA IN A STORAGE APPARATUS CAN BE USED FOR OTHER PURPOSES, AND A RECORDING MEDIUM RECORDING AN IMAGE DECODING PROGRAM

(75) Inventors: Tetsuji Mochida, Neyagawa (JP); Tokuzo Kiyohara, Osaka (JP); Makoto Hirai, Suita (JP); Hideshi Nishida, Nishinomiya (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/249,658

(22) Filed: Feb. 12, 1999

(30) Foreign Application Priority Data

Feb. 13, 1998 (JP) .......................... 10-030963

(51) Int. Cl.[7] .............................. G06F 12/02
(52) U.S. Cl. .................. 345/543; 345/555; 348/445; 348/512; 348/714; 375/240.25; 375/240.26; 375/240.01
(58) Field of Search ................ 345/543, 501, 345/530, 531, 544, 555; 348/400.1, 401.1, 402.1, 390.1, 384.1, 609.1, 415.1, 416.1, 441, 445, 500, 512, 516, 714–716, 718; 375/240.01, 240.26, 240.25, 240.15; 382/232

(56) References Cited

U.S. PATENT DOCUMENTS 5,903,282 A * 5/1999 Schoner et al. ............. 345/558
5,973,740 A * 10/1999 Hrusecky ............... 375/240.15
6,115,072 A * 9/2000 Vuong et al. ............... 348/445

FOREIGN PATENT DOCUMENTS

JP          8265700          10/1996

* cited by examiner

Primary Examiner—Kee M. Tung
(74) Attorney, Agent, or Firm—Price and Gess

(57) ABSTRACT

When an OSD data storage area for storing OSD data needs to be reserved, an area of a frame storage apparatus that should store macroblocks corresponding to an invisible area on a screen is allocated as the OSD data storage area. There is no degradation in picture quality. When doing so, the data reduction control unit 64 receives an instruction to reserve the OSD data storage area and discards the corresponding macroblocks. The OSD data access unit 63 writes the OSD data into an area of the frame storage apparatus that was assigned to store the discarded macroblocks.

30 Claims, 28 Drawing Sheets

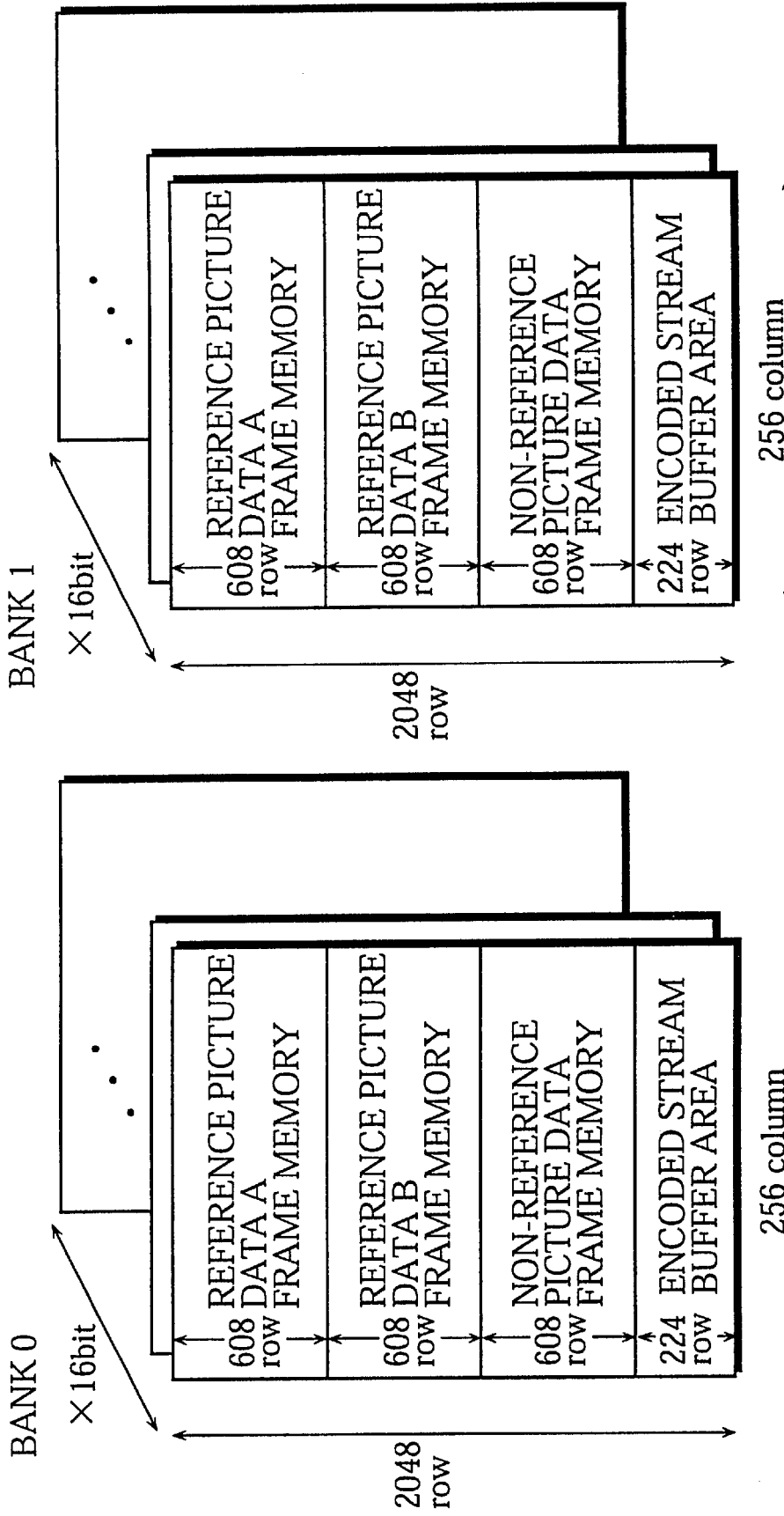

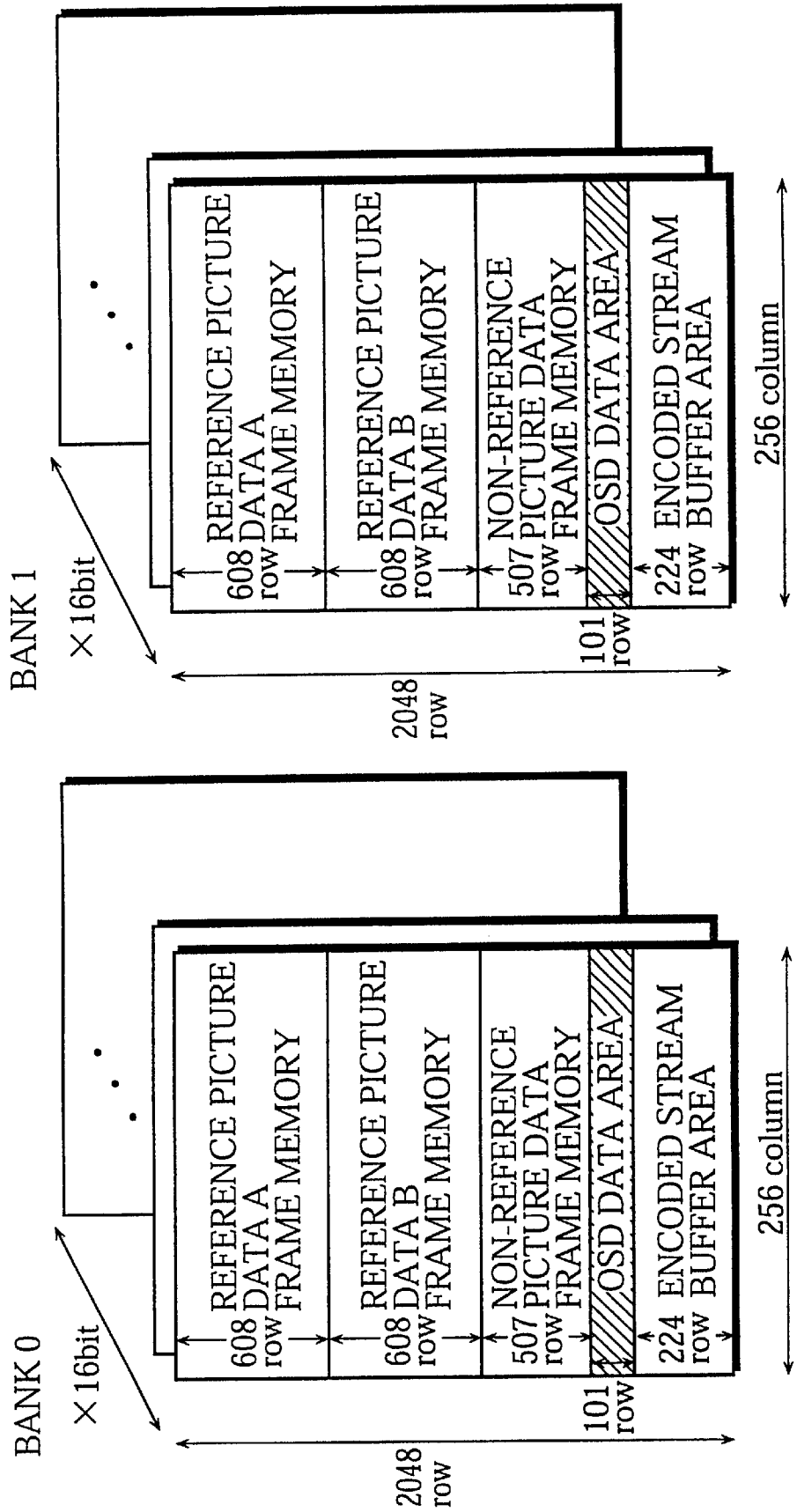
BACKGROUND ART  FIG. 1B

FIG. 5A

| ROW_ADDRESS | BANK 0 | BANK 1 |
|---|---|---|
| 00000000 | MacroBlock(0, 0)~(15, 31) | MacroBlock(16, 0)~(31, 31) |
| 00000001 | MacroBlock(32, 0)~(47, 31) | MacroBlock(48, 0)~(63, 31) |
| 00000010 | MacroBlock(64, 0)~(79, 31) | MacroBlock(80, 0)~(95, 31) |
| 00000011 | MacroBlock(96, 0)~(111, 31) | MacroBlock(112, 0)~(127, 31) |
| 00000100 | MacroBlock(128, 0)~(143, 31) | MacroBlock(144, 0)~(159, 31) |
| ⋮ | ⋮ | ⋮ |
| 00010100 | MacroBlock(640, 0)~(655, 31) | MacroBlock(656, 0)~(671, 31) |
| 00010101 | MacroBlock(672, 0)~(687, 31) | MacroBlock(688, 0)~(703, 31) |
| 00010110 | MacroBlock(704, 0)~(719, 31) | MacroBlock(0, 32)~(15, 63) |
| 00010111 | MacroBlock(16, 32)~(31, 63) | MacroBlock(32, 32)~(47, 63) |
| 00011000 | MacroBlock(48, 32)~(63, 63) | MacroBlock(64, 32)~(79, 63) |
| 00011001 | MacroBlock(80, 32)~(95, 63) | MacroBlock(96, 32)~(111, 63) |
| 00011010 | MacroBlock(112, 32)~(127, 63) | MacroBlock(128, 32)~(143, 63) |
| 00011011 | MacroBlock(144, 32)~(159, 63) | MacroBlock(160, 32)~(175, 63) |
| ⋮ | ⋮ | ⋮ |
| 000101010 | MacroBlock(656, 32)~(671, 63) | MacroBlock(672, 32)~(687, 63) |
| 000101011 | MacroBlock(688, 32)~(703, 63) | MacroBlock(704, 32)~(719, 63) |

FIG. 5B

| ROW_ADDRESS | BANK 0 | BANK 1 |
|---|---|---|
| 10000000 | CbCr_MB(0, 0)~(7, 31) | CbCr_MB(8, 0)~(15, 31) |
| 10000001 | CbCr_MB(16, 0)~(23, 31) | CbCr_MB(24, 0)~(31, 31) |
| 10000010 | CbCr_MB(32, 0)~(39, 31) | CbCr_MB(40, 0)~(47, 31) |
| 10000011 | CbCr_MB(48, 0)~(55, 31) | CbCr_MB(56, 0)~(63, 31) |
| 10000100 | CbCr_MB(64, 0)~(71, 31) | CbCr_MB(72, 0)~(79, 31) |
| ⋮ | ⋮ | ⋮ |
| 10010100 | CbCr_MB(320, 0)~(327, 31) | CbCr_MB(328, 0)~(335, 31) |
| 10010101 | CbCr_MB(336, 0)~(343, 31) | CbCr_MB(344, 0)~(351, 31) |
| 10010110 | CbCr_MB(352, 0)~(359, 31) | CbCr_MB(0, 32)~(7, 63) |
| 10010111 | CbCr_MB(8, 32)~(15, 63) | CbCr_MB(16, 32)~(23, 63) |
| 10011000 | CbCr_MB(24, 32)~(31, 63) | CbCr_MB(32, 32)~(39, 63) |
| 10011001 | CbCr_MB(40, 32)~(47, 63) | CbCr_MB(48, 32)~(55, 63) |
| 10011010 | CbCr_MB(56, 32)~(63, 63) | CbCr_MB(64, 32)~(71, 63) |
| 10011011 | CbCr_MB(72, 32)~(79, 63) | |

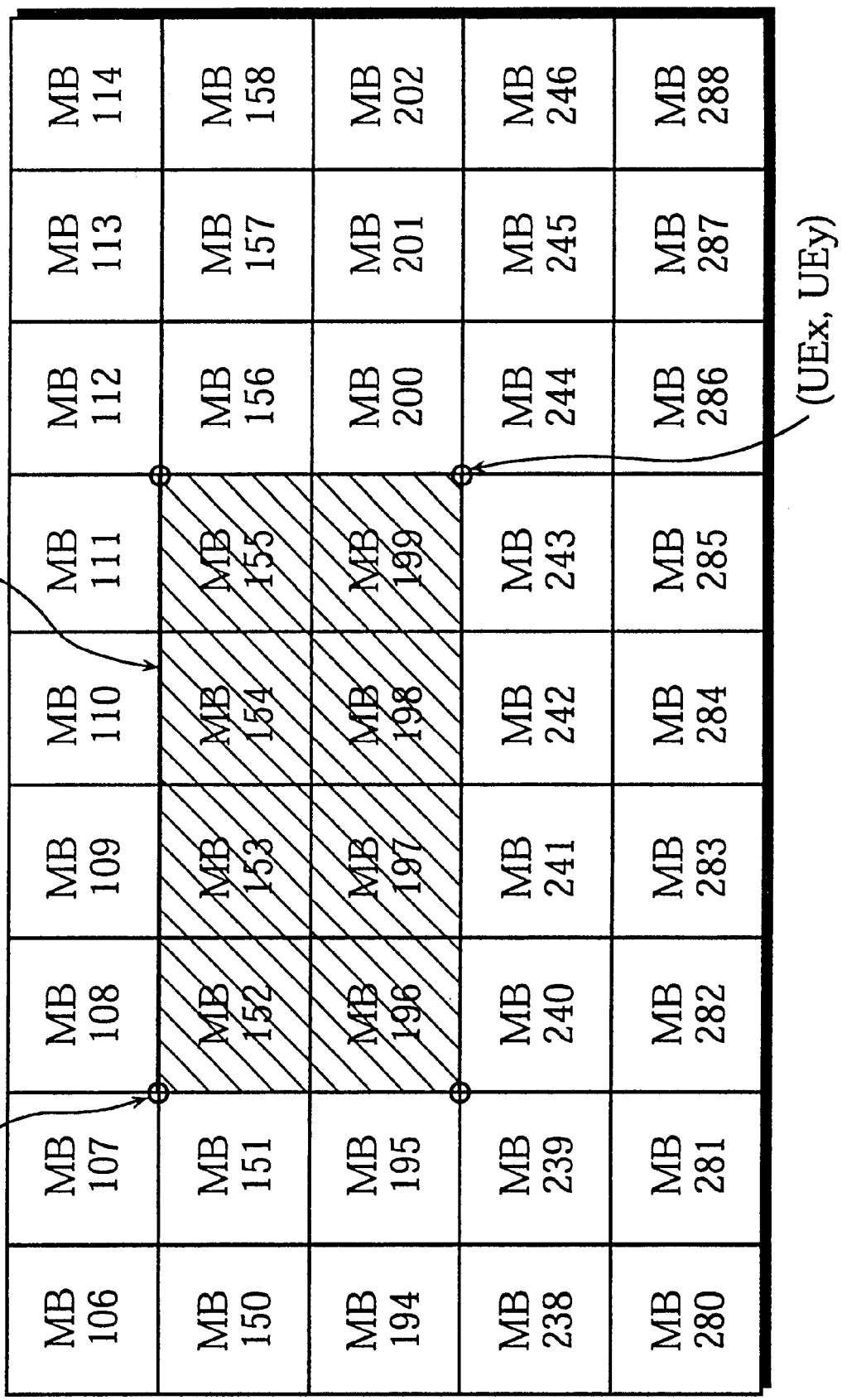

FRAME MEMORY INTERNAL FREE AREA MANAGEMENT TABLE

| MACROBLOCK POSITION INFORMATION | ADDRESS INFORMATION (FIRST ADDRESS, DATA LENGTH) |
|---|---|
| (i0,j0) ~ (i44,j0) | page_address Y0, length 45X512 |
| | page_address C0, length 45X512 |
| (i0,j1) | page_address Y45 |
| | page_address C45 |
| (i0,j2) | page_address Y90 |
| | page_address C90 |
| (i0,j3) | page_address Y135 |
| | page_address C135 |
| (i20,j3) ~ (i23,j3) | page_address Y155, length 4X512 |
| | page_address C155, length 4X512 |
| (i20,j4) ~ (i23,j4) | page_address Y200, length 4X512 |
| ... | ... |

⟨DECODING ORDER⟩

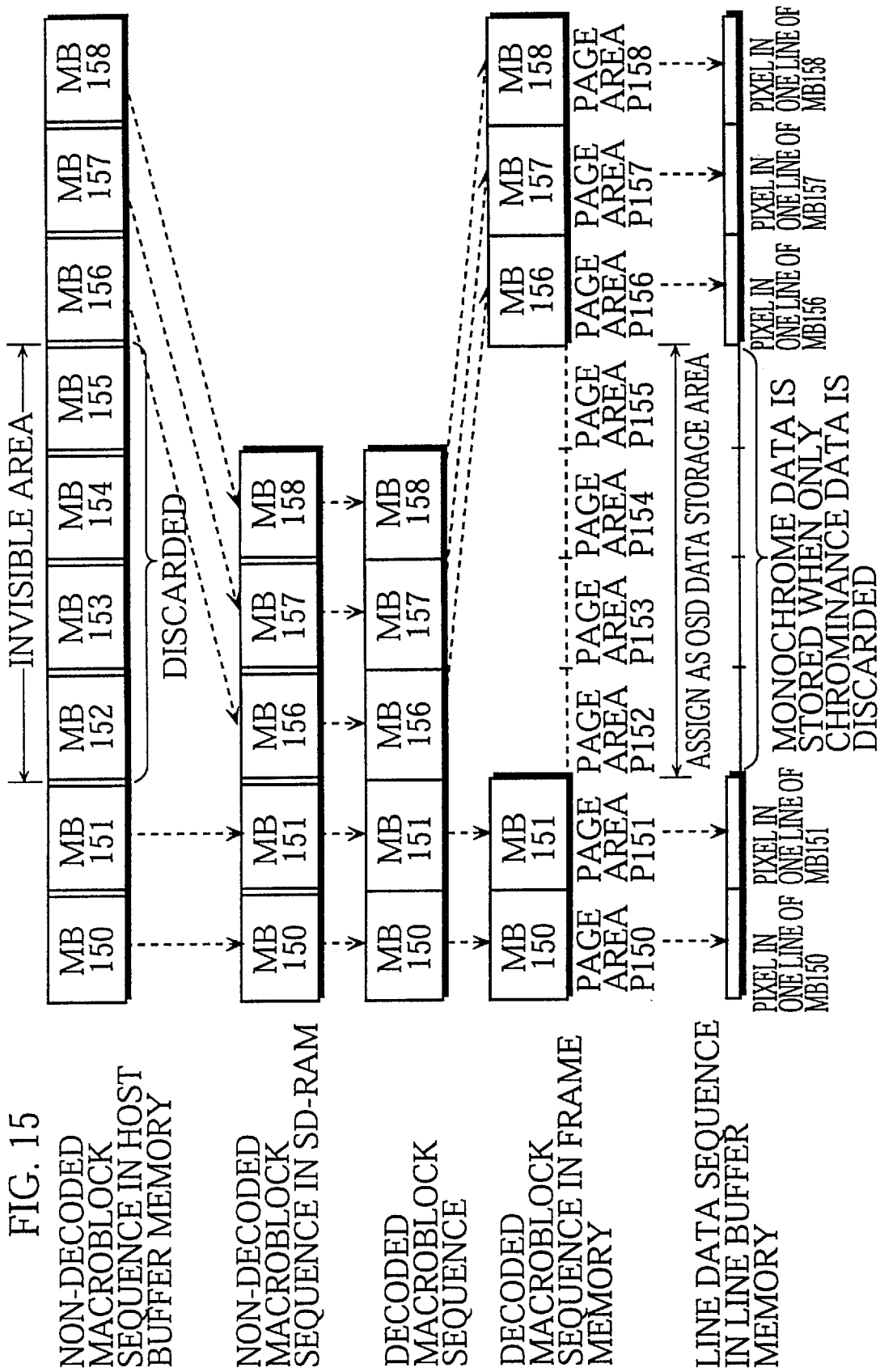

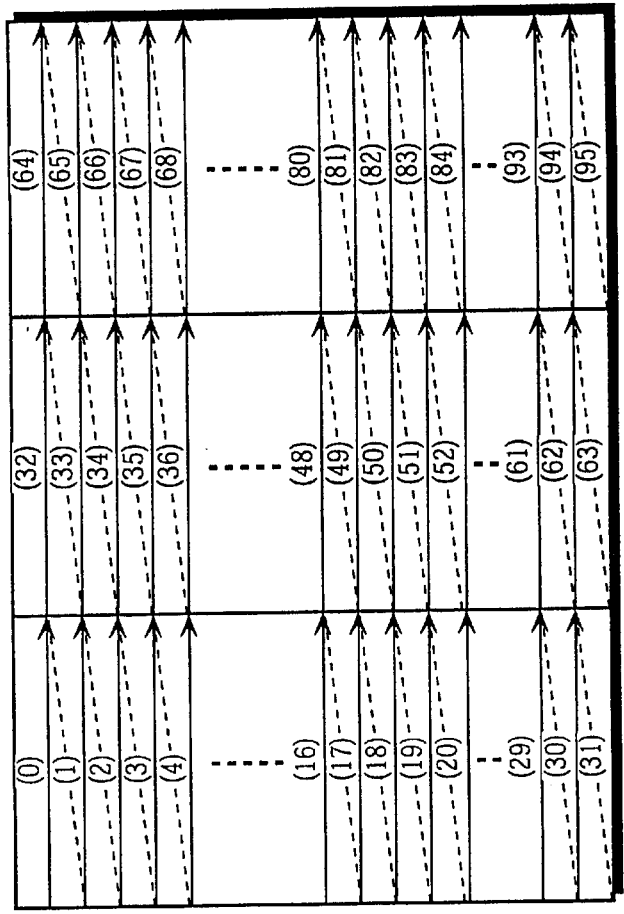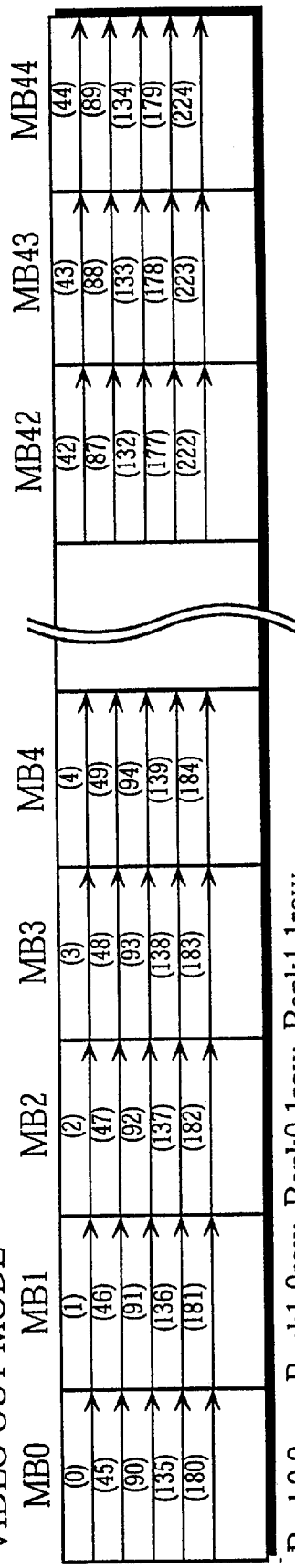
FIG. 16A LINEAR ADDRESSING MODE
FIG. 16B VIDEO OUT MODE

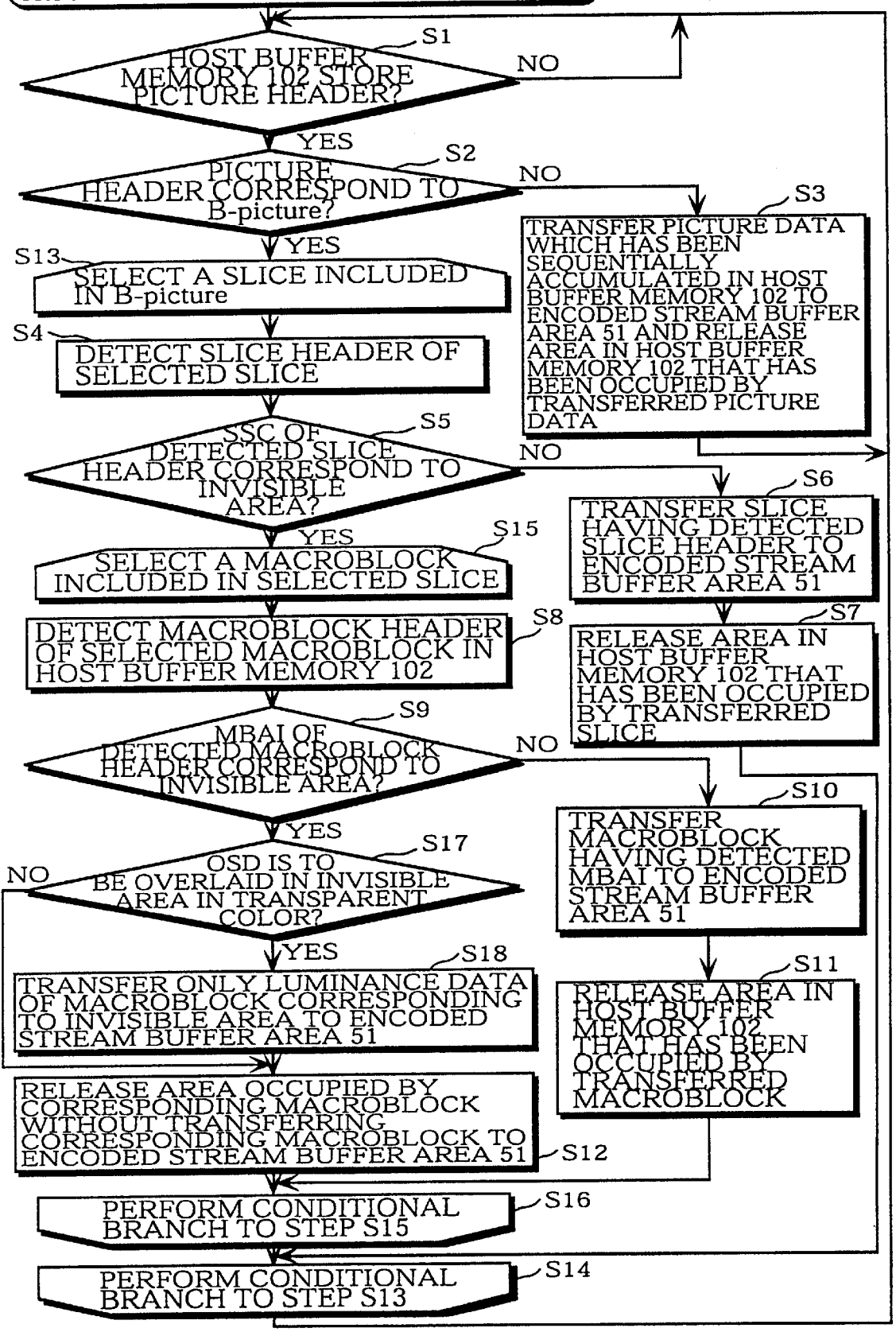

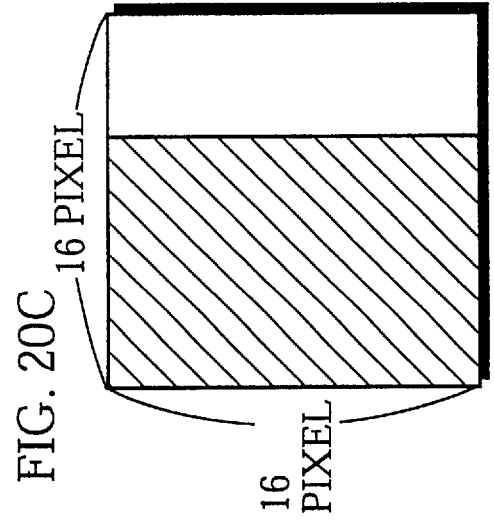
FIG. 20A
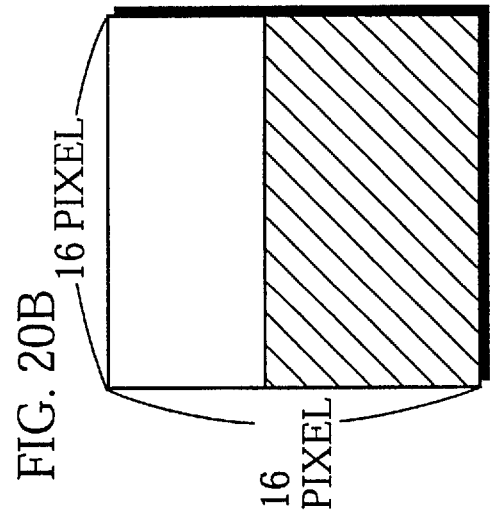
FIG. 20B
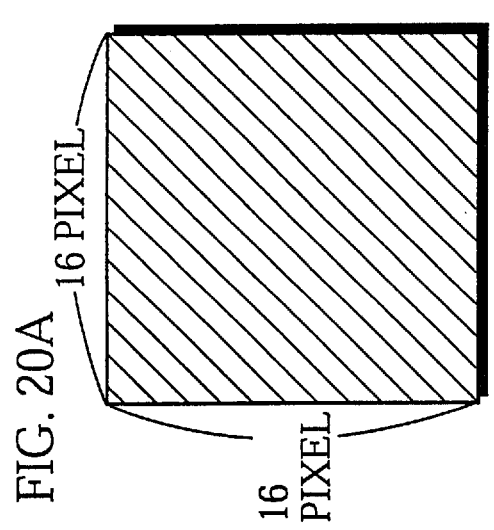
FIG. 20C
INVISIBLE AREA
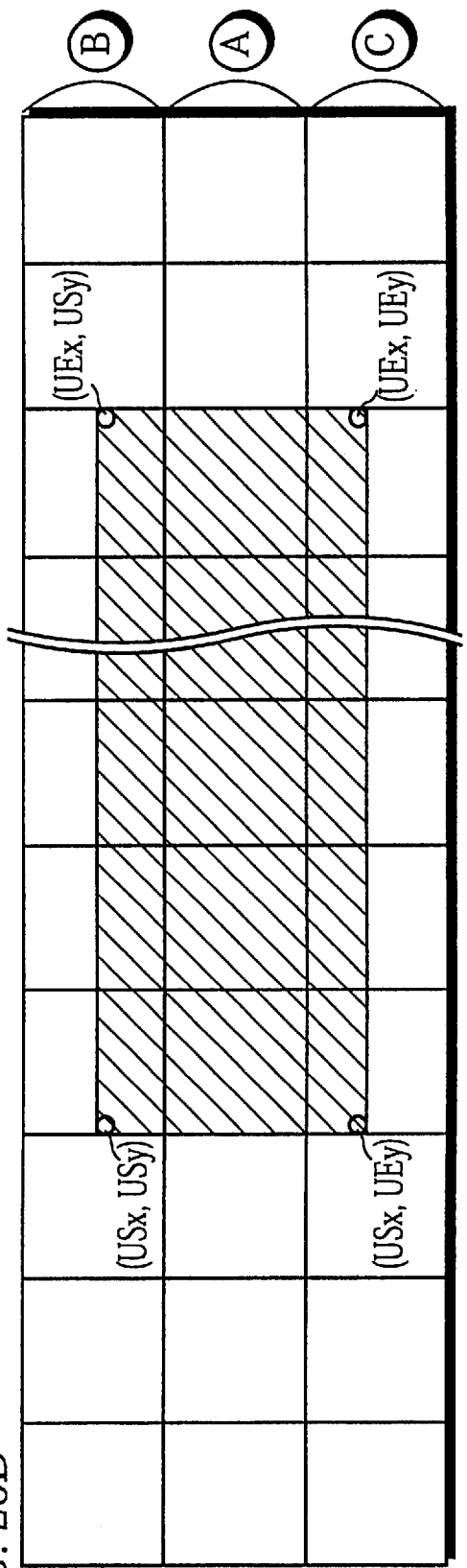
FIG. 20D

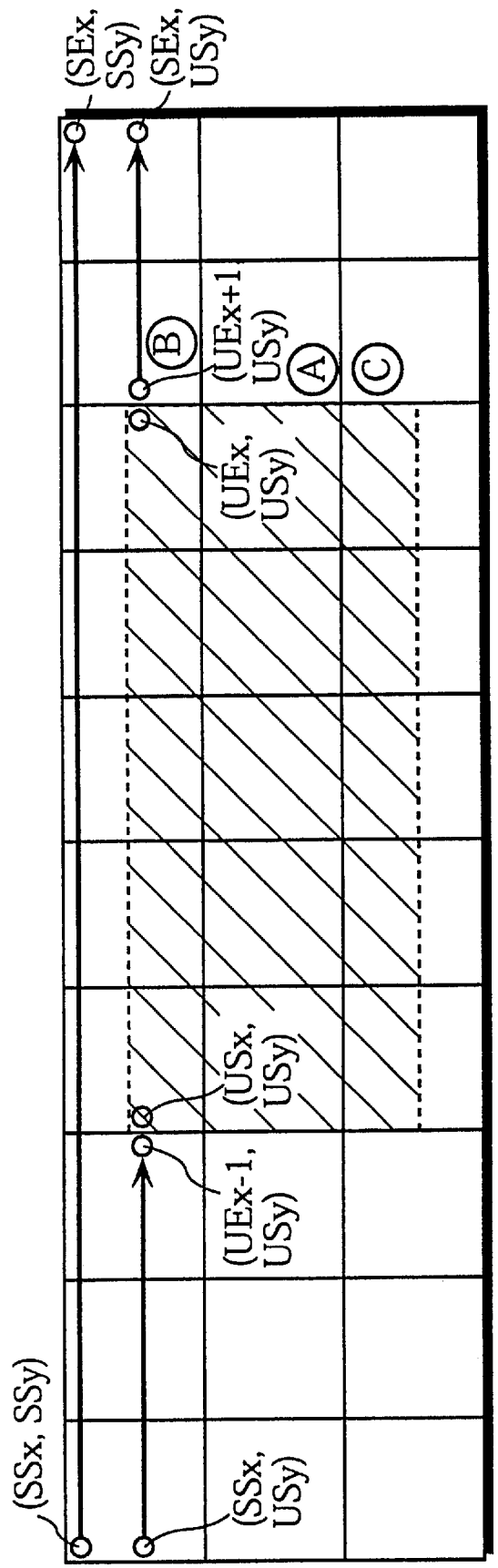

IMAGE DECODING APPARATUS THAT PERFORMS IMAGE DECODING SO THAT FRAME AREAS THAT OCCUPY A LARGE AREA IN A STORAGE APPARATUS CAN BE USED FOR OTHER PURPOSES, AND A RECORDING MEDIUM RECORDING AN IMAGE DECODING PROGRAM

This application is based on application No. H10-030963 filed in Japan, the content of which is hereby incorporated by reference.

BACKGROUND OF THE INVENTION

1. Field of the Invention

The present invention relates to an image decoding apparatus, and more specifically relates to a technique for improving the utilization ratio of a memory.

2. Description of the Background Art

MPEG2 (Moving Pictures Experts Group2) standard is highly regarded by technicians all over the world as the international standard technique for compressing moving pictures. In particular, when encoded according to an intra-frame bidirectionally predictive method, moving pictures are compressed at a. very high ratio using interrelations between a picture and its previously and subsequently displayed pictures. This method is of particular value when recording moving pictures onto a removable storage medium or transmitting moving pictures to a remote destination via a communication medium.

While moving pictures are compressed at a high ratio with this method, there is apprehension among technicians that image decoding apparatuses may increase in complexity and scale. This is because when decoding picture data that is encoded according to the intra-frame bidirectionally predictive method (such picture data being ordinarily referred to as "B-pictures (Bidirectionally Predictive pictures)"), an image decoding apparatus needs to refer to previously and subsequently displayed pictures. This means that the frame memories of the image decoding apparatus need to store both previously displayed pictures and subsequently displayed pictures that are referred to by B-pictures. As a result, the scale of the frame memories is increased. Each frame memory is a memory area for storing pixel data that is displayed on a screen for one frame. Pixel data stored in the frame memory is read and is converted into image signals in line units (720 horizontal pixels by one vertical pixel, for instance) in synchronization with a horizontal synch signal of the display.

FIG. 1A shows an example of an SD-RAM (Synchronous Dynamic RAM) where three frame memories are reserved. This example is based on the assumption that the SD-RAM is two banks by 2048 rows by 256 columns in size. There are pictures of three picture types, which is to say the aforementioned B-pictures, Intra pictures (I-pictures), and Predictive pictures (P-pictures). I-pictures are encoded according to an intra-frame encoding method and B-pictures are encoded according to an intra-frame forward direction predictive encoding method. The SD-RAM shown in FIG. 1A includes three frame memories which store decoded pictures according to the picture types.

More specifically, in this drawing, the non-reference picture data frame memory stores a decoded B-picture; the reference picture data A frame memory stores a decoded I-picture or a decoded P-picture; and the reference picture data B frame memory stores a decoded I-picture or a decoded P-picture. Each frame memory occupies an area which is two banks by 608 rows by 256 columns in size in the SD-RAM. Decoded picture data stored in the reference picture data A frame memory and the reference picture data B frame memory is referred to while a B-picture is decoded.

A large area in the SD-RAM is allocated to these frame memories under the stated conventional technique. Therefore, there is a problem that the SD-RAM cannot provide work areas aside from the frame memories. Work areas are used for several purposes, such as for storing on-screen display (OSD) data. The word "OSD" refers to character fonts and computer graphics overlaid on moving pictures. The OSD data is used to display the operation states of an image decoding apparatus, such as "play", "stop", and "record", on a screen. The OSD data is also used to display a menu for allowing an operator to input desired instructions.

When the SD-RAM does not include enough space for storing OSD data, an additional memory needs to be used to provide an OSD data storage area for storing the OSD data. When such an additional memory cannot be used, a memory mapping method may be used to provide the OSD data storage area, as shown in FIG. 1B. In FIG. 1A, the non-reference picture data frame memory occupies a memory area which is 2 banks by 608 rows by 256 columns in size. On the other hand, in FIG. 1B, the memory area assigned to the non-reference picture data frame memory is reduced to the size of 2 banks by 507 rows by 256 columns. As a result, a free area which is 2 banks by 101 rows by 256 columns in size is obtained and the free area is used as the OSD data storage area.

This technique where the data size of B-pictures is reduced is based on the characteristic that B-pictures are not referred to by other pictures. While degradation in the picture quality of an I-picture or P-picture stored in the frame memories may adversely affect the picture quality of other pictures that refer to the I-picture or P-picture, a B-picture stored in a frame memory is not referred to by other pictures. Therefore, the degradation in the picture quality of B-pictures does not adversely affect the picture quality of other pictures. As a result, a reduction in the size of the frame memory area for storing picture data of a B-picture is admissible, unlike the cases of an I-picture or a P-picture. Accordingly, the frame memory for storing picture data of B-pictures is made smaller than the frame memories for storing picture data of I-pictures and P-pictures.

To reduce the size of picture data of B-pictures, the chrominance data of B-pictures is generated at an interval (is subsampled). This method is based on the human eye's sensitivity to small changes in brightness and relative insensitivity to small changes in color.

However, subsampling of the chrominance data of B-pictures accentuates the differences in picture quality between the display of I-pictures and P-pictures and the display of B-pictures. That is, picture quality is not degraded when I-pictures and P-pictures are displayed, but picture quality is degraded when B-pictures are displayed. Therefore, when moving pictures are replayed, pictures of degraded picture quality and pictures of non-degraded picture quality are alternately displayed on the screen. Furthermore, when recording moving pictures onto a removable storage medium or transmitting moving pictures to a remote destination via a communication medium, the moving pictures need to be compressed at a high ratio. Therefore, many frames are encoded as B-pictures and few frames are encoded as I-pictures and P-pictures. Accordingly, when the picture quality of the frequently occurring B-pictures is degraded, an operator may have the impression that the picture quality of the moving pictures as a whole is poor.

A playback apparatus ordinarily requires an OSD data storage area when an OSD needs to be displayed according to the instruction input by an operator. Since an OSD is displayed according to an operator's instruction, the OSD data storage area only needs to be reserved when OSD data is displayed. However, a work area is always reserved under the stated conventional technique, which causes a problem that the picture quality of B-pictures is sacrificed unnecessarily.

SUMMARY OF THE INVENTION

The object of the present invention is to provide an image decoding apparatus which reserves a work area for storing various data, such as OSD data, without sacrificing picture quality.

To achieve the state object, the image decoding apparatus of the present invention decodes pieces of picture data included in a video stream according to an instruction from a host apparatus and writes the decoded pieces of picture data into a storage apparatus, where each piece of picture data is of one of a plurality of picture types which are each related to one of different encoding methods, and the storage apparatus includes a plurality of frame areas for storing most recently decoded pieces of picture data separately according to the plurality of picture types, where the image decoding apparatus includes: a decoding unit for decoding pieces of picture data included in the video stream one at a time while referring to decoded picture data in at least one of the plurality of frame areas; a writing unit for writing a newly decoded piece of picture data over a piece of picture data in one of the plurality of frame areas; and an area allocation unit for allocating, on receiving a reservation request to reserve a work area in the storage apparatus from the host apparatus, a region in one of the plurality of frame areas as the work area, where the region should store (1) a certain part of a piece of picture data of a predetermined picture type that is yet to be decoded by the decoding unit, or (2) a certain part of a decoded piece of picture data of the predetermined picture type that is yet to be written by the writing unit.

With the stated construction, only when the host apparatus issues the reservation request for reserving a work area, the image decoding apparatus discards a certain part of picture data and reserves the work area in a region of the frame memory that was assigned to store the discarded part of picture data. Therefore, even if the certain part of picture data is lost, the picture quality of picture data is not degraded as a whole. As a result, the host apparatus performs additional functions without using an additional memory.

When a certain part of picture data that is yet to be decoded is discarded to reserve a work area, unnecessary decode processing is omitted. As a result, decode processing is performed at high speed and the amount of consumption of electricity is reduced.

Here, the host apparatus may output the reservation request and host data to be written into the storage apparatus to the image decoding apparatus, each piece of picture data may include a plurality of pieces of pixel data for one frame, and the area allocation unit may include: an area storage unit for storing area location information showing a location of a predetermined area on a screen; a prohibition unit for prohibiting decoding of pixel data that corresponds to the predetermined area, the corresponding pixel data being included in picture data of the predetermined type; and a first writing unit for writing the host data into the allocated region.

Here, the host apparatus may continuously output the reservation request for a predetermined period, and the prohibition unit may continuously prohibit the decoding of the corresponding pixel data for the predetermined period.

Here, the area storage unit may store the area location information showing an outer area of the screen.

With the stated constructions, the predetermined area corresponds to the outer area of picture data. In many cases, the outer area is not displayed on a screen. Therefore, even if a certain part of picture data corresponding to the outer area is discarded, an operator is not disturbed by the discarded picture data.

Here, the host apparatus may start to output the reservation request when on-screen display data is to be written into the work area, the host apparatus may output the on-screen display data as the host data with the reservation request, and the area storage unit may store the area location information showing an area of the screen where the on-screen display data is displayed.

With the stated construction, the predetermined area corresponds to a picture area onto which an OSD is overlaid. Such a picture area is not displayed on a screen. Therefore, even if picture data in the picture area is discarded, an operator is not disturbed by the discarded picture data.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1A shows an SD-RAM in which three frame memories are reserved;

FIG. 1B shows an SD-RAM in which the size of the non-reference picture data frame memory is reduced to two banks by 507 rows by 256 columns to obtain a free area and the free area is used as an OSD data storage area;

FIG. 5A shows the contents of the page area that stores luminance data;

FIG. 5B shows the contents of the page area that stores chrominance data;

FIG. 11B shows macroblocks which become invisible due to an OSD;

FIG. 11C shows OSD image data that forms a character "P" using sequences of "0s" and "1s";

FIG. 12 shows an frame memory internal free area management table that includes a macroblock position information column and an address information column;

FIG. 15 shows a state where macroblocks are discarded;

FIG. 16A shows a state where the decoded pixel writing unit 66 writes pixel data;

FIG. 16B shows a state where the display line reading unit 67 reads pixel data;

FIG. 17 is a flowchart showing the processing of the data reduction control unit 64;

FIG. 20A shows a macroblock that entirely corresponds to an invisible area;

FIG. 20B shows a macroblock which includes pixel lines that entirely correspond to an invisible area;

FIG. 20C shows a macroblock which includes pixel lines that partially correspond to an invisible area;

FIG. 20D shows a state where the decoded pixel writing unit 66 writes pixel data in A–C areas into page areas;

FIG. 21A shows a state where pixel data in B area shown in FIG. 20D is written;

FIG. 21B shows a state where pixel data in C area shown in FIG. 20D is written; and FIG. 22 shows a state where pixel data is read from A–C areas shown in FIG. 20D.

DESCRIPTION OF THE PREFERRED EMBODIMENTS

Embodiment 1

An MPEG stream reproduction apparatus which includes an image decoding apparatus of the present invention is described below with reference to the drawings.

Figure 2:
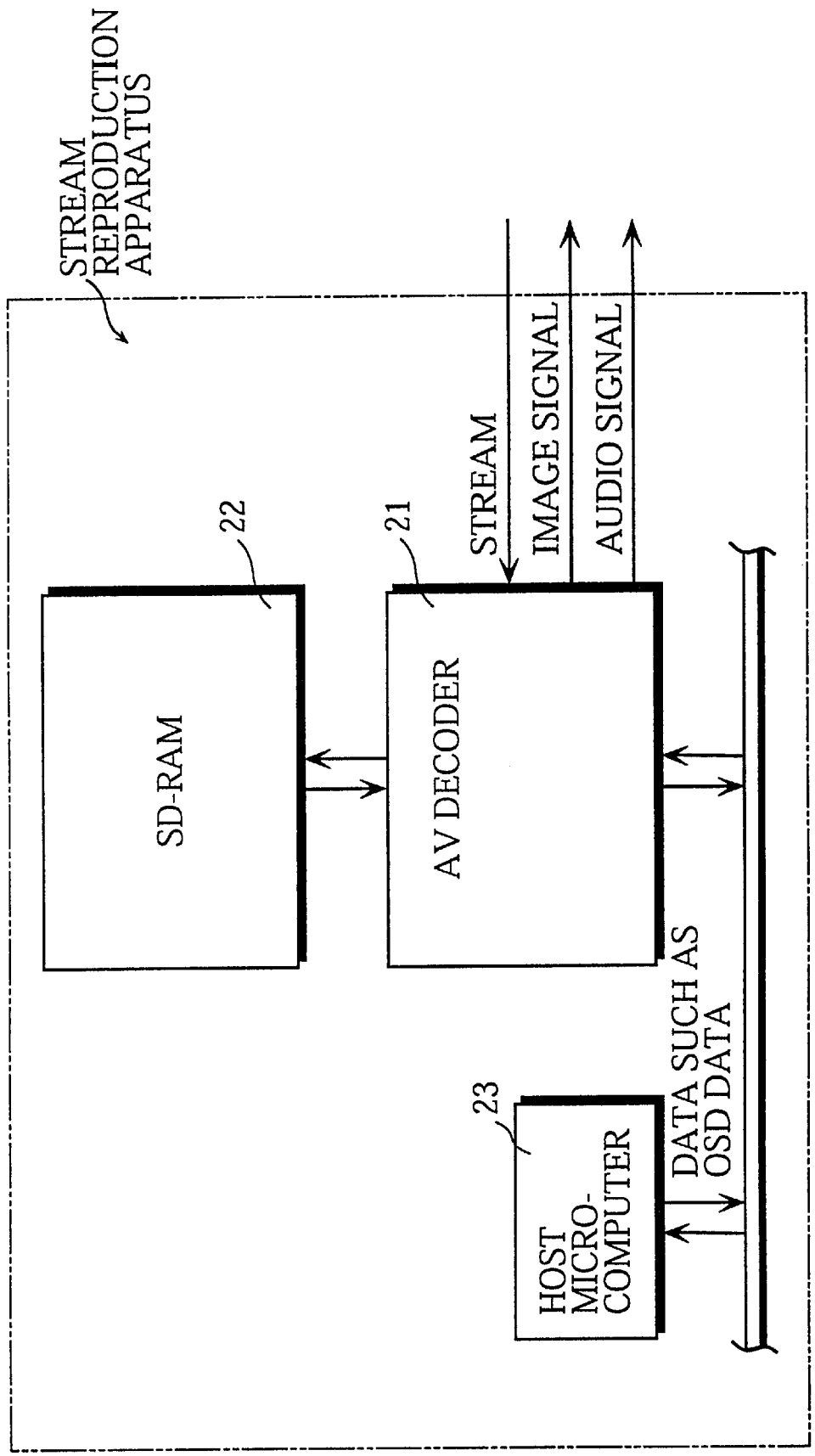
FIG. 2 shows the construction of an MPEG stream reproduction apparatus to which the image decoding apparatus of the present invention is applied.

FIG. 2 shows the construction of the MPEG stream reproduction apparatus. The MPEG stream reproduction apparatus includes an AV decoder 21 which is equivalent to the image decoding apparatus of the present invention, an SD-RAM 22, and a host microcomputer 23.

The SD-RAM 22 is 2 banks by 2048 rows by 256 columns in size. One row area in the SD-RAM 22 which is 512 bytes in size is hereinafter referred to as a page area.

Figure 3:
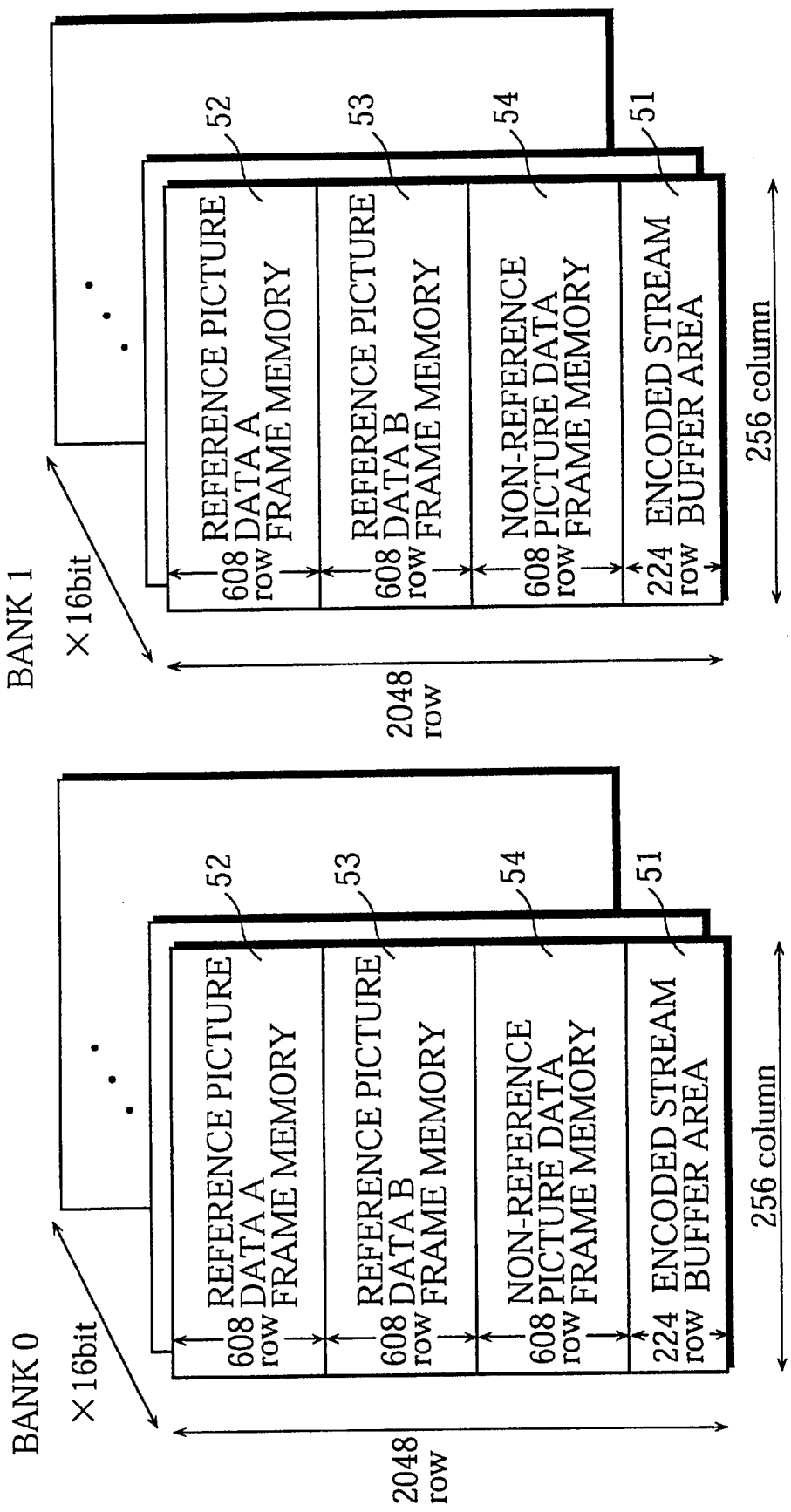
FIG. 3 shows the memory allocation in the SD-RAM 22.

FIG. 3 shows the memory allocation in the SD-RAM 22. As can be seen from this drawing, the SD-RAM 22 is divided into an encoded stream buffer area 51, a reference picture data A frame memory 52, a reference picture data B frame memory 53, and a non-reference picture data frame memory 54.

The encoded stream buffer area 51 is used to accumulate MPEG streams that have been input from the outside but are yet to be decoded. Here, the MPEG streams are bitstreams which each include a plurality of elementary streams. Each elementary stream can be a video stream or an audio stream. The data construction of a video stream is shown in FIG. 4.

Figure 4:
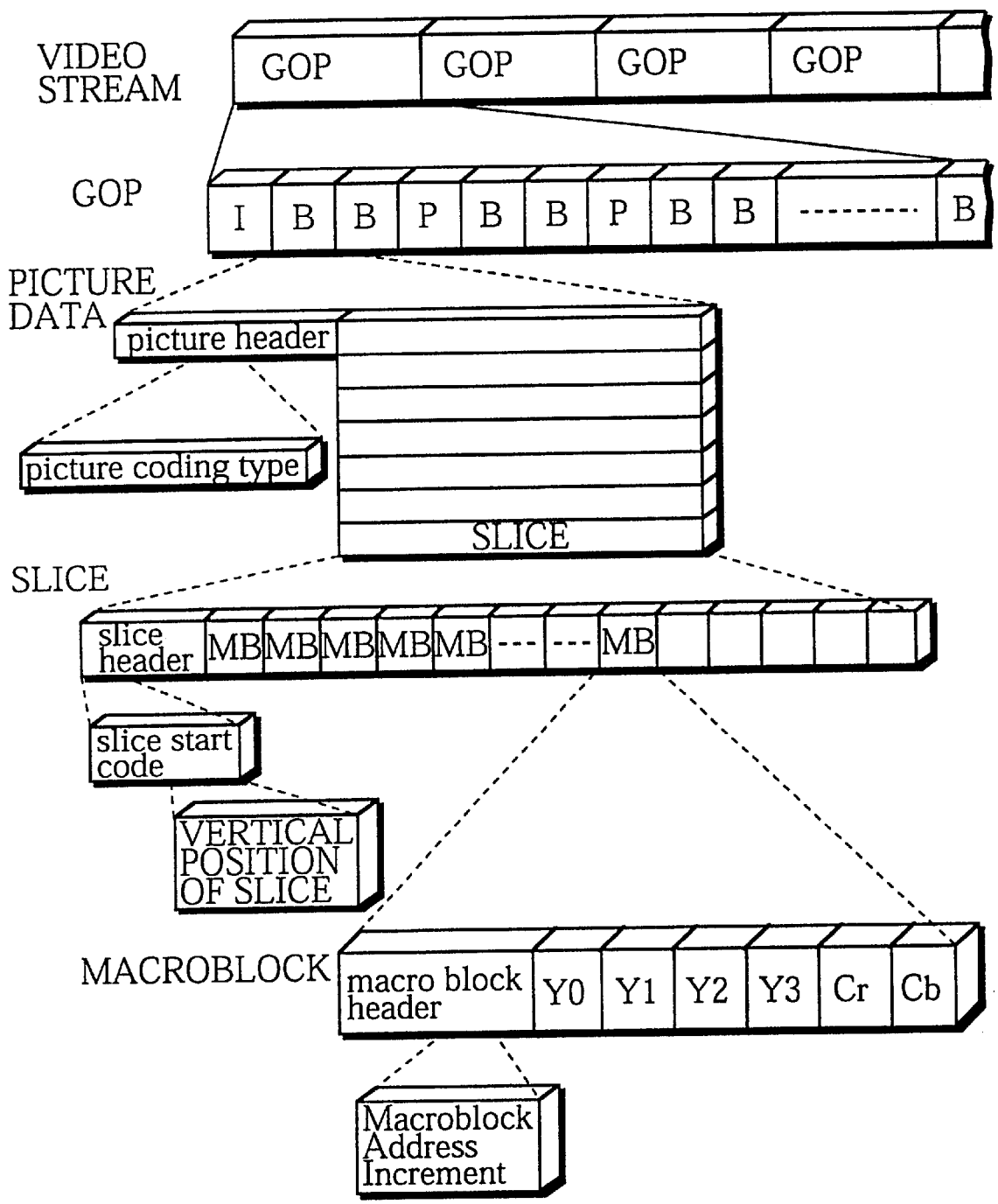
FIG. 4 shows the data construction of a video stream.

FIG. 4 shows the data construction of a video stream. Each video stream is compressed based on spacial frequency components of pictures. With this picture compression method, pictures are compressed in units of a certain number of pixels on a screen. The smallest unit for compressing picture data is called a block and includes eight horizontal pixels by eight vertical pixels. The second smallest unit for compressing picture data is the MB (macroblock) shown in the fifth level in FIG. 4. The MB includes 16 horizontal pixels by 16 vertical pixels. This macroblock is ordinarily used as the unit for encoding pictures and for compressing information according to correlations between pictures. The unit for decoding encoded pictures is also set to the macroblock and motion compensation is performed according to the intra-frame predictive method.

The first level in FIG. 4 shows the construction of a video stream. The video stream includes a plurality of Groups of Pictures (GOPs).

The second level in FIG. 4 shows the construction of a GOP. The GOP includes at least one of three types of pictures which are namely I-pictures, B-pictures, and P-pictures (these types of pictures are indicated by the legends "I", "P", and "B" in this drawing). The GOP definitely includes an I-picture at the start of the GOP.

The third level in FIG. 4 shows the construction of picture data. Picture data includes a picture header and a plurality of slices.

The fourth level in FIG. 4 shows the construction of a slice. A slice includes a slice header and a plurality of macroblocks. The fifth level in FIG. 4 shows the construction of a macroblock. A macroblock includes a macroblock header and is composed of 16 horizontal pixels by 16 vertical pixels. A macroblock includes four luminance blocks which are each composed of 8*8 pieces of luminance data, a blue chrominance block ("Cb block") composed of 8*8 pieces of blue chrominance data, and a red chrominance block ("Cr block") composed of 8*8 pieces of red chrominance data. While 16*16 pieces of luminance data are included in a macroblock, only 8*8 pieces of blue chrominance data and 8*8 pieces of red chrominance data are included in a macroblock. This is because the display resolution of the chrominance data does not need to be as high as that of the luminance data. Therefore, the number of pieces of chrominance data is reduced, which reduces the data size of the macroblock.

The picture header, slice header, and macroblock header shown in this drawing include various information for motion compensation. However, among the various information, the picture coding type in the picture header, the slice start code in the slice header, and the macroblock address increment in the macroblock header are mainly referred to in this specification.

The picture coding type (PCT) in a picture header shows which one of I-picture, B-picture, or P-picture is represented by the picture data including this picture header.

By referring to the PCT, it can be determined which one of I-picture, B-picture, or P-picture is composed by the picture data.

The slice start code (SSC) in a slice header is a four-byte code that shows the start of the slice including this slice header. The last byte of the slice start code shows the vertical position of the slice.

The macroblock address increment (MBAI) gives different information depending on whether the MBAI is included in the first macroblock within a slice or not. The MBAI included in the first macroblock within a slice shows how many macroblocks are located before the first macroblock in the same line of a picture using absolute coordinates. In other cases, the MBAI shows how many macroblocks are skipped from the immediately preceding macroblock. More specifically, when several macroblocks are missing from the slice, the MBAI of the macroblock that immediately succeeds the missing macroblocks shows the number of the missing macroblocks.

By referring to the SSC and MBAI, it can be determined where the picture contents of each macroblock should be placed within picture data.

The frame memories 52–54 are respectively two banks by 608 rows by 256 columns in size and store pixel data of one frame that is obtained by decoding an I-picture, a P-picture, or a B-picture.

The decoded picture data stored in these frame memories is read in a predetermined order by a line buffer memory 140 and is converted into picture signals by a video output unit 108. The predetermined order is called the "display order" and differs from the order of picture data within video streams (the encoding order). Here, the provision of a plurality of frame memories 52–54 also helps when rearranging the picture data in the display order.

The following description concerns how a plurality of pieces of picture data included in a GOP are stored in the frame memories 52–54. FIG. 13A shows the relation between the plurality of pieces of picture data and the frame memories 52–54. In FIG. 13A, the GOP includes picture data I1, B2, B3, P4, B5, B6, P7, B8, and B9. The arrows shown in FIGS. 13A and 13B indicate the relations between picture data that is referred to by other picture data and picture data that refers to other picture data during decode processing. As can be understood from these arrows, the picture data I1 and P0 is referred to when the picture data B2 is decoded. The picture data I1 and P0 is also referred to when the picture data B3 is decoded. The picture data I1 is also referred to when the picture data P4 is decoded.

Figure 13C:
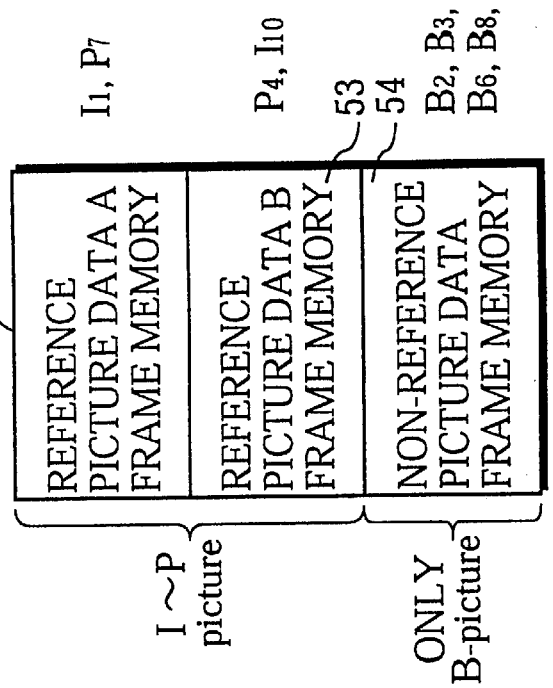
FIGS. 13A–13D shows the state where a plurality of pieces of picture data are stored in the frame memories 52–54.
Figure 13A:
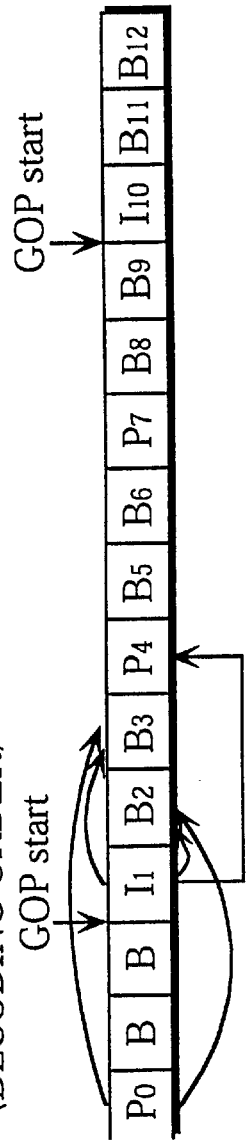

The plurality of pieces of picture data are stored in the frame memories 52–54, as shown in FIG. 13C. The I-picture I1 and P-picture P7 are stored in the reference picture data A frame memory 52; the P-picture P4 and the I-picture I10 are stored in the reference picture data B frame memory 53; and the B-pictures B2, B3, B5, B6, B8, and B9 are stored in the non-reference picture data frame memory 54.

Figure 13B:
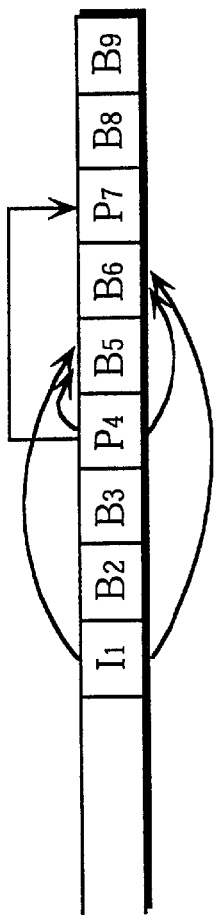
Figure 13D:

FIG. 13D shows the order in which the picture data I1, B2, B3, P4, B5, B6, P7, B8, and B9 shown in FIGS. 13A and 13B is displayed. As can be seen from FIG. 13D, the picture data I1 that is located at the start of the GOP is displayed after the picture data B2 and B3. Also, the picture data P4 that is located before the picture data B5 and B6 in the GOP is displayed after the picture data B5 and B6.

One page area in these frame memories stores a plurality of pieces of luminance data in two macroblocks or a set of blue chrominance data and a set of red chrominance data of four macroblocks. The address of each page area storing macroblocks (a bank address-a row address) is calculated from a predetermined arithmetic expression using X and Y coordinates of the macroblocks on a screen. The address of each piece of pixel data (a bank address-a row address-a column address) is calculated from a predetermined arithmetic expression using X and Y coordinates of the pixel corresponding to the piece of pixel data on a screen.

As an example of the contents of the frame memories, FIG. 5A shows the contents of areas in a frame memory at the row addresses 0000_0000 onwards that store luminance data; FIG. 5B shows the contents of areas in a frame memory at the row addresses 1000_0000 onwards that store chrominance data.

Figure 6A:
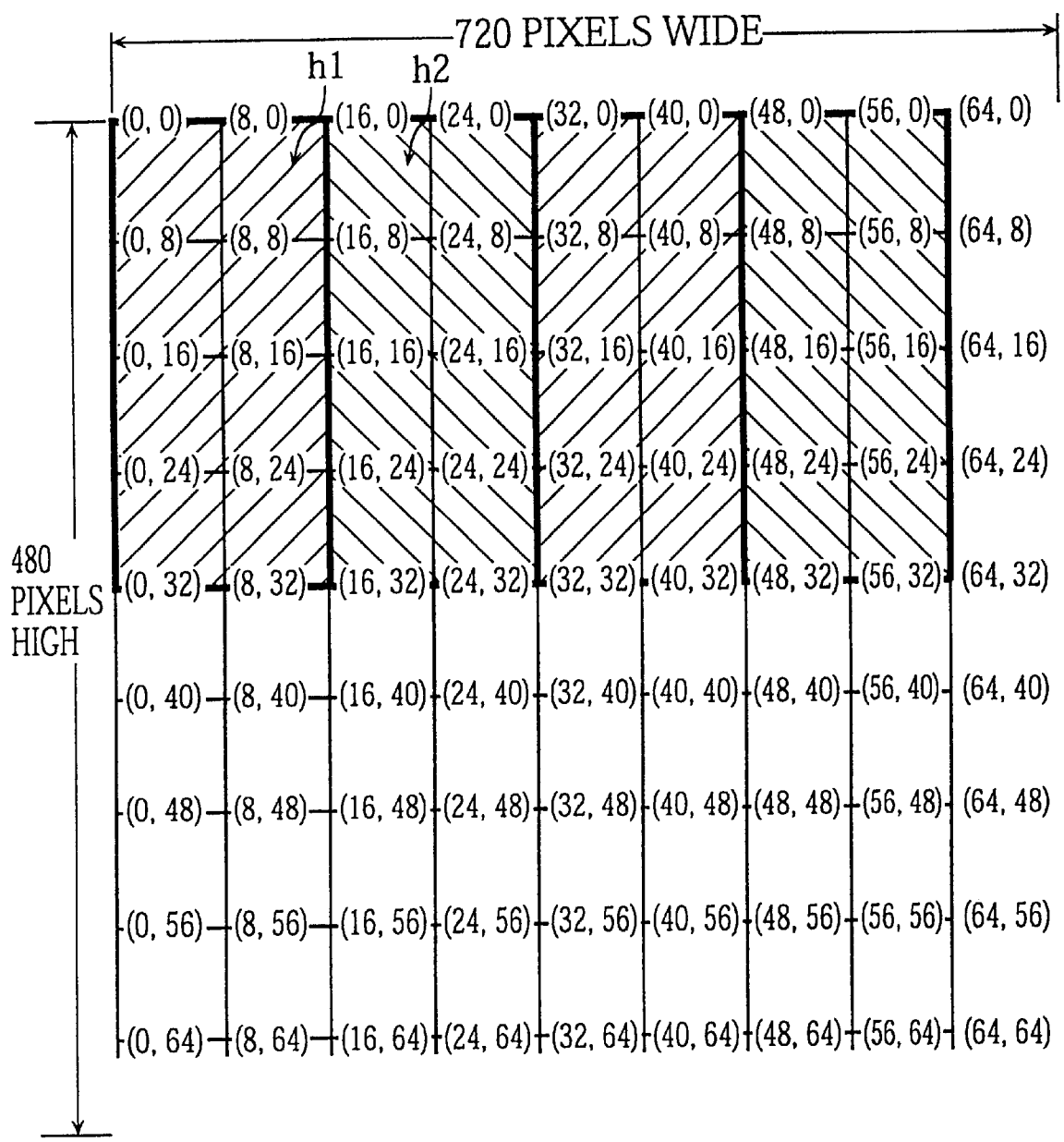
FIG. 6A shows the luminance data stored in a page area.

In FIG. 5A, the page area having the bank address 0 and the row address 0000_0000 stores the luminance data in the rectangular area (0,0)–(15,31) whose upper left vertex is set to (0,0) and lower right vertex is set to (15,31). This rectangular area equates to the hatched area hi shown in FIG. 6A. The page area having the bank address 1 and the row address 0000_0000 stores the luminance data in the rectangular area (16,0)–(31,31) whose upper left vertex is set to (16,0) and lower right vertex is set to (31,31). This rectangular area equates to the hatched area h2 shown in FIG. 6A.

Figure 6B:
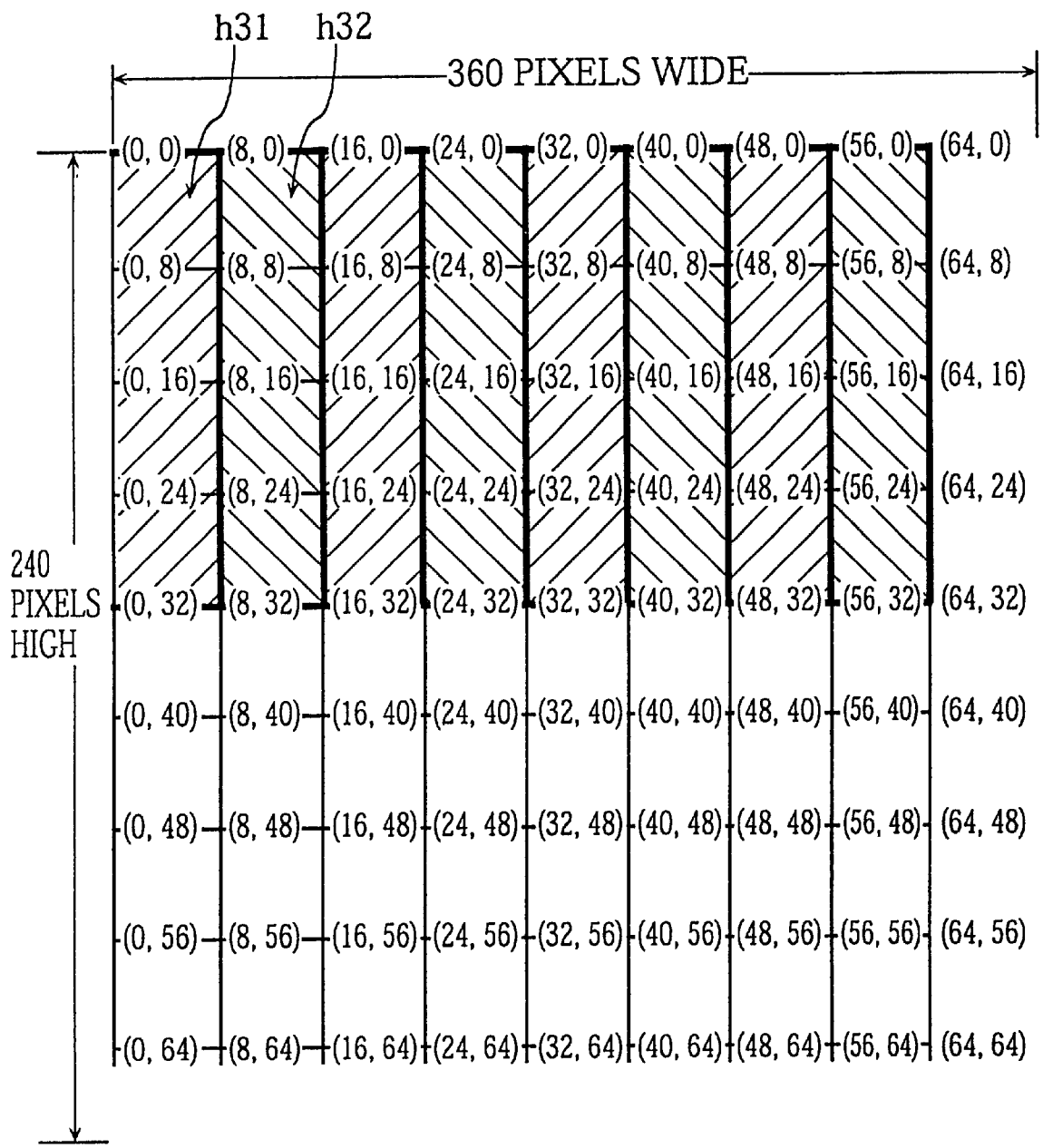
FIG. 6B shows the chrominance data stored in a page area.

In FIG. 5B, the page area having the bank address 0 and the row address 1000_0000 stores the blue and red chrominance data in the rectangular area (0,0)–(7,31) whose upper left vertex is set to (0,0) and lower right vertex is set to (7,31). This rectangular area equates to the hatched area h31 shown in FIG. 6B. The page area having the bank address 1 and the row address 1000_0000 stores the blue and red chrominance data in the rectangular area (8,0)–(15,31) whose upper left vertex is set to (8,0) and lower right vertex is set to (15,31). This rectangular area equates to the hatched area h32 shown in FIG. 6B.

The host microcomputer 23 performs the overall control of the MPEG stream reproduction apparatus. On receiving an MPEG stream from the outside, the host microcomputer 23 instructs the AV decoder 21 to decode the received MPEG stream. When an operator inputs an instruction for displaying an OSD, the host microcomputer 23 instructs the AV decoder 21 to reserve an OSD data storage area by outputting area reserve request signals in an on-demand style. After the AV decoder 21 reserves the OSD data storage area in the SD-RAM 22, the host microcomputer 23 transfers a look up table (LUT) and OSD data to be written into the reserved OSD data storage area.

The LUT includes a plurality of pieces of entry data. Each piece of entry data includes luminance data, blue chrominance data, and red chrominance data that are to be allocated to one pixel within an OSD. Each of the plurality of pieces of entry data also includes the mixture ratio α indicating the ratio between the OSD and the moving picture onto which the OSD is to be overlaid. Different values are assigned to the luminance data, blue chrominance data, and red chrominance data in each piece of entry data to display a specific color, such as red, blue, green, or yellow.

The OSD data includes OSD image data and a command. The command includes height and width of character fonts or graphics generated by expanding the OSD image data, coordinate information showing where to overlay expanded OSD image data on a screen, entry addresses of the LUT, and the start address of the OSD image data.

The OSD image data represents image contents using a predetermined number of bits per pixel. This predetermined number of bits determines the number of colors used to draw pixels. For instance, when the predetermined number of bits is one, pixels corresponding to the OSD image data can be drawn using two colors. When the number is two, pixels corresponding to the OSD image data can be drawn using four colors, and when the number is four, pixels corresponding to the OSD image data can be drawn using 16 colors.

Each entry address of the LUT corresponds to one value of the predetermined number of bits. The entry address shows which piece of entry data (luminance data, blue chrominance data, and red chrominance data) is used to color the pixel having the value.

For instance, the OSD image data forms a character "P" using sequences of "0s" and "1s" as shown in FIG. 11C. Each pixel having the value "0" is set to be displayed in a background color and each pixel having the value "1" is set to be displayed in a foreground color. For instance, when bits "0" are related to the entry address of entry data that corresponds to green, and when bits "1" are related to the entry address of entry data that correspond to yellow, the character "P" shown in FIG. 11C is displayed in yellow on a screen with the background being displayed in green.

The host microcomputer 23, when transferring OSD data in the manner described above, informs the AV decoder 21 whether the OSD data should be displayed transparently or non-transparently. In this embodiment, when OSD data should be displayed non-transparently, the entry data specified by a plurality of entry addresses includes the mixture ratio α=100%; when OSD data should be displayed transparently, the specified entry data includes the mixture ratio α=99% or less.

The AV decoder 21 writes the LUT and OSD data that is output from the host microcomputer 23 into a frame memory area of the SD-RAM 22. The AV decoder 21 outputs the first address of the frame memory area and the data length of the LUT and OSD data to the host microcomputer 23. The host microcomputer 23 holds the output address and data length. Thereafter, the host microcomputer 23 continuously outputs area reservation request signals until an operator inputs an instruction that specifies the erase of the OSD.

On the other hand, when the operator inputs an instruction that only specifies the replay of moving pictures and an OSD data storage area does not need to be reserved, the host microcomputer 23 reserves no OSD data storage area.

To read OSD data from the SD-RAM 22, the host microcomputer 23 outputs to the AV decoder 21 an instruction that specifies the reading of the OSD data, the first address that shows from which frame memory area the OSD data is to be read, and the data length of the OSD data, according to the first address of the frame memory area output from the AV decoder 21.

In this embodiment, the host microcomputer 23 issues the area reservation request signals when OSD data should be stored in the SD-RAM 22. However, the host microcomputer 23 may issue the area reservation request signals when there is the risk that sufficient memory area for picture decode processing cannot be reserved in the SD-RAM 22 because a large memory area is used for other processing of the MPEG stream reproduction apparatus, or when a memory area needs to be newly reserved because the MPEG stream reproduction apparatus needs to perform additional functions.

Figure 7:
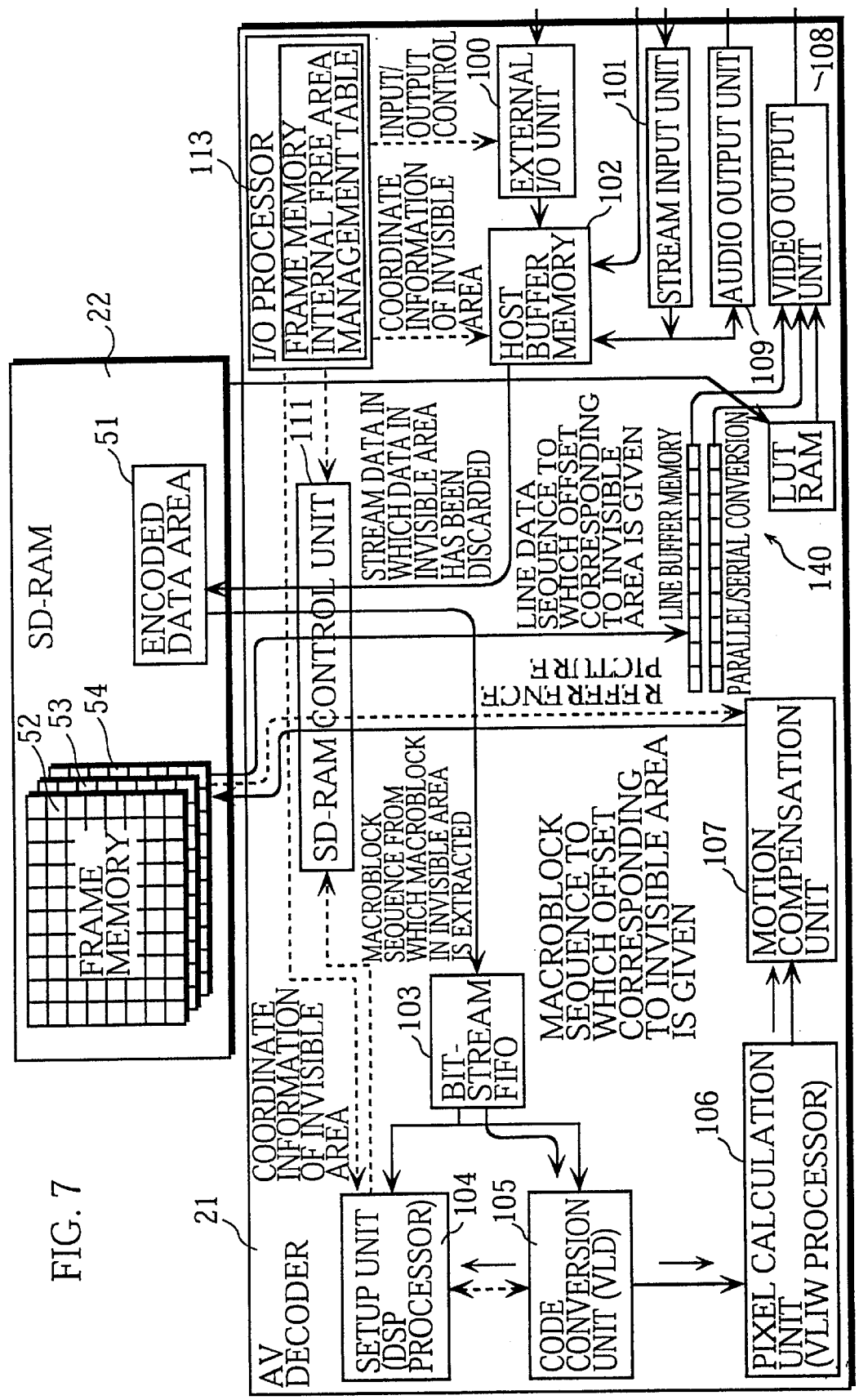
FIG. 7 shows the internal construction of the AV decoder 21.

The AV decoder 21 decodes the MPEG stream input from the outside and outputs the decoded MPEG stream as picture signals and audio signals. FIG. 7 shows the internal construction of the AV decoder 21. As can be seen from FIG. 7, the AV decoder 21 includes an external I/O unit 100, a stream input unit 101, a host buffer memory 102, a bitstream FIFO 103, a setup unit 104, a code conversion unit 105, a pixel calculation unit 106, a motion compensation processing unit 107, a video output unit 108, an audio output unit 109, an SD-RAM control unit 111, an I/O processor 113, and a line buffer memory 140.

The external I/O unit 100 temporarily writes OSD data outputted by the host microcomputer 23 into the host buffer memory 102 and transfers the written OSD data to the OSD data storage area reserved in the SD-RAM 22. When instructed by the host microcomputer 23 to read the OSD data from the OSD data storage area, the external I/O unit 100 also reads the OSD data from the OSD data storage area and outputs the read OSD data to the host microcomputer 23.

The stream input unit 101 separates an MPEG stream, which has been fetched from a storage or communication medium and input into the AV decoder 21, into a video elementary stream (a video stream) and an audio elementary stream (an audio stream), and writes the elementary streams into the host buffer memory 102.

The host buffer memory 102 stores the elementary streams written by the stream input unit 101.

The SD-RAM control unit 111 performs a DMA transfer to the encoded stream buffer area 51 on the stored MPEG stream on being instructed by the I/O processor 113 to transfer the MPEG stream stored in the host buffer memory 102. The SD-RAM control unit 111 also transfers elementary streams from the SD-RAM to the bitstream FIFO 103 according to the amount of the decoded MPEG stream that is held by the bitstream FIFO 103. Furthermore, the SD-RAM control unit 111 performs a DMA transfer between the motion compensation processing unit 107 and the frame memories 52–54, between the frame memories 52–54 or an OSD data storage area and the line buffer memory 140, and between the LUT in an OSD data storage area in the SD-RAM and an LUT-RAM.

The bitstream FIFO 103 fetches the elementary streams from the encoded stream buffer area 51 and holds the fetched elementary streams in a first-in first-out method. Then, the bitstream FIFO 103 outputs video streams and audio streams out of the held elementary streams respectively to the code conversion unit 105 and to the setup unit 104.

The setup unit 104 waits, when the elementary stream held by the bitstream FIFO 103 is a video stream, for the held elementary stream to be decoded by the code conversion unit 105 so that the header of the elementary stream is decompressed. After the header is decompressed, the setup unit 104 analyzes the header and extracts motion vectors. Then, the setup unit 104 decodes an audio stream while various processing, such as variable length code decoding, inverse quantization, inverse discrete cosine transform, and motion compensation, is performed.

The code conversion unit 105 performs variable length code decoding on four luminance blocks (Y0, Y1, Y2, Y3) and two chrominance blocks (Cb, Cr) whenever a macroblock is received.

The pixel calculation unit 106 performs inverse quantization and inverse discrete cosine transform on four luminance blocks and two chrominance blocks which have been subjected to variable length code decoding in the code conversion unit 105.

The motion compensation processing unit 107 reads data in areas referred by the luminance and chrominance blocks that have been processed by the pixel calculation unit 106 from the frame memories 52 and 53, performs half-pel processing on each of the processed luminance and chrominance blocks, averages the results of the half-pel processing, and performs motion compensation by adding the value output from the pixel calculation 106 to the averaging result. Then, the motion compensation processing unit 107 writes the result of the motion compensation into one of the frame memories 52–54.

The line buffer memory 140 stores pixel data of two lines that is read from the frame memories 52–54.

The video output unit 108 performs filtering on the pixel data in a plurality of lines that are read from the line buffer memory 104, the OSD data, and the LUT read from the LUT-RAM, according to a predetermined enlargement ratio and the mixture ratio a shown by entry data of the LUT stored in the LUT-RAM. Then, the video output unit 108 converts the pixel data and OSD data into video signals, and outputs the video signals to a display, such as a television set, connected to the AV decoder 21.

Figure 8:
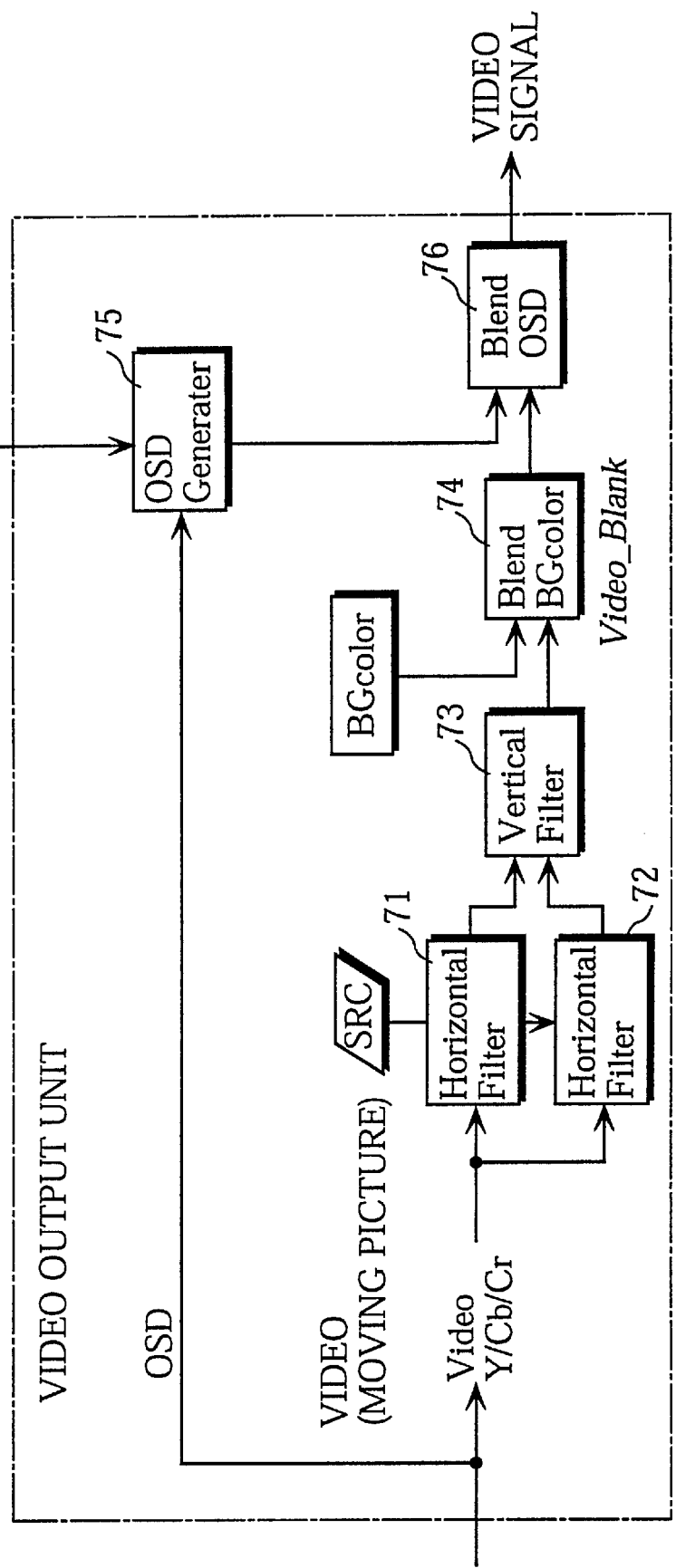
FIG. 8 shows the internal construction of the video output unit 108.

Here, because the mixture ratio α of OSD data that should be displayed transparently is set to 99% or less, the video output unit 108 performs filtering so that a blend OSD 76 shown in FIG. 8 outputs image data where the ratio of moving picture data in the image data is 1% or more. Because the mixture ratio α of OSD data that should be displayed non-transparently is set to 100%, the video output unit 108 performs filtering so that the blend OSD 76 outputs image data where the ratio of moving picture data in the image data is 0%.

FIG. 8 shows the internal construction of the video output unit 108. The video output unit 108 includes two horizontal filters 71 and 72 for performing filtering in line units according to the scaling ratio (SRC) of a picture to be displayed, a vertical filter 73 for performing filtering between lines, the blend BGcolor 74 for blending pixel data with background color (BGcolor) in line units, an OSD generator 75 for generating an OSD according to the OSD data read from the line buffer memory 140 and the LUT stored in the LUT-RAM, and a blend OSD 76 for blending pixel data with the OSD in line units.

The audio output unit 109 receives the audio data that is decoded by the setup unit 104 and transferred through the SD-RAM 22 and the host buffer memory 102, converts the received audio data into audio signals, and outputs the audio signals to the speaker apparatus connected to the AV decoder 21.

The I/O processor 113 performs a plurality of tasks for the AV decoder 21 in a time division multiplexing method by allocating the plurality of tasks to a plurality of threads.

Figure 9:
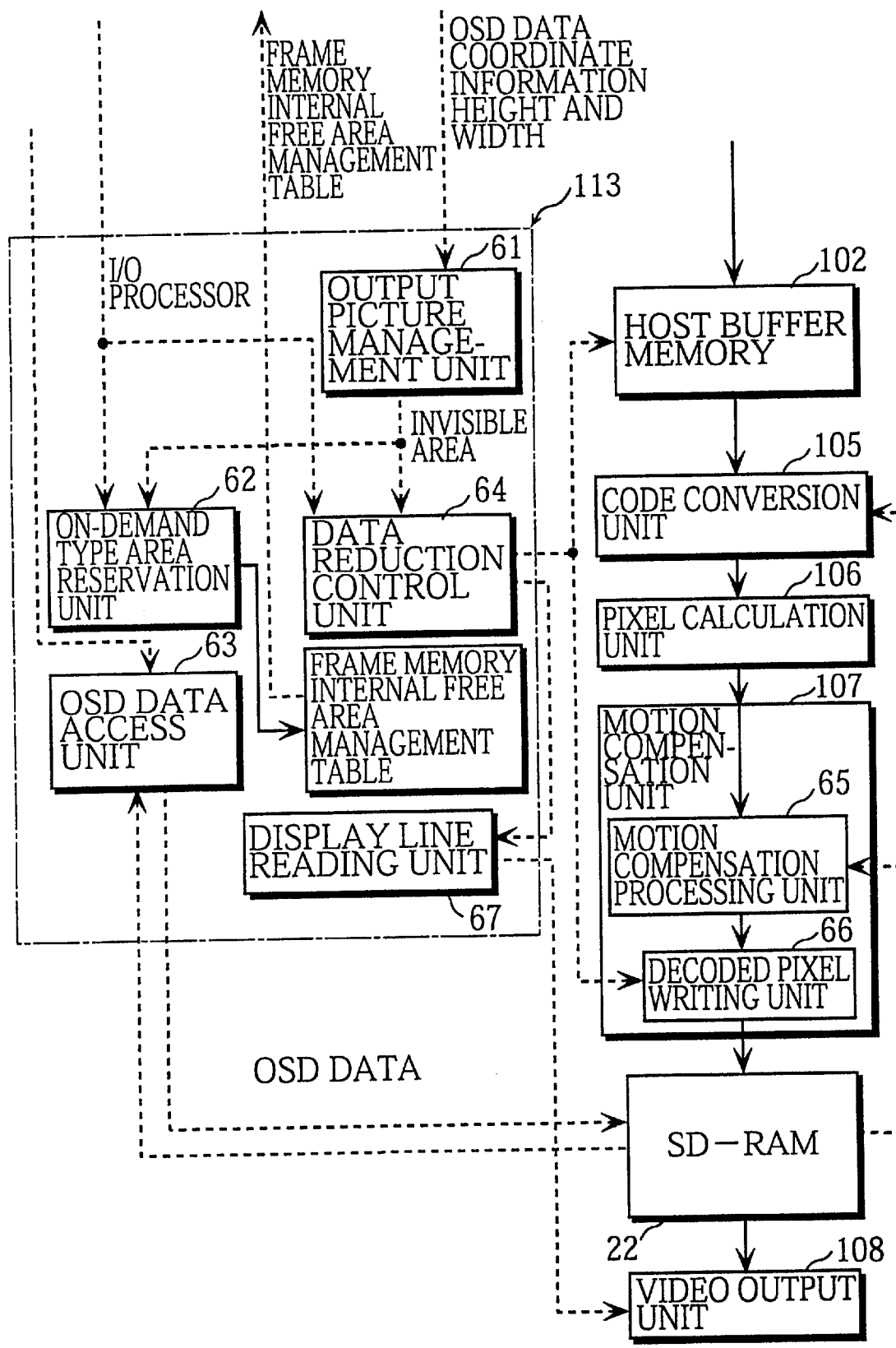
FIG. 9 shows the internal construction of the AV decoder 21 in terms of functions.

In this embodiment, the plurality of tasks includes decoding load reduction processing that is performed during a decode process, the process for reserving an OSD data storage area, and DMA transfer control between memories. FIG. 9 shows the functional construction of the AV decoder 21 to which the stated tasks are assigned. In FIG. 9, the I/O processor 113 includes an output picture management unit 61, an on-demand type area reservation unit 62, an OSD data access unit 63, a data reduction control unit 64, and a display line reading unit 67, in terms of functions. The motion compensation processing unit 107 includes a motion compensation processing unit 65 and a decoded pixel writing unit 66, in terms of functions.

The output picture management unit 61 stores the height and width and coordinate information of picture areas that are not displayed on a screen and so cannot be seen by an operator, within the picture of decoded picture data stored in the frame memories (hereinafter such picture areas are referred to as "invisible areas"). The invisible areas include picture areas on which OSD data is overlaid and those which are not displayed due to display performance limitations.

Figure 10A:
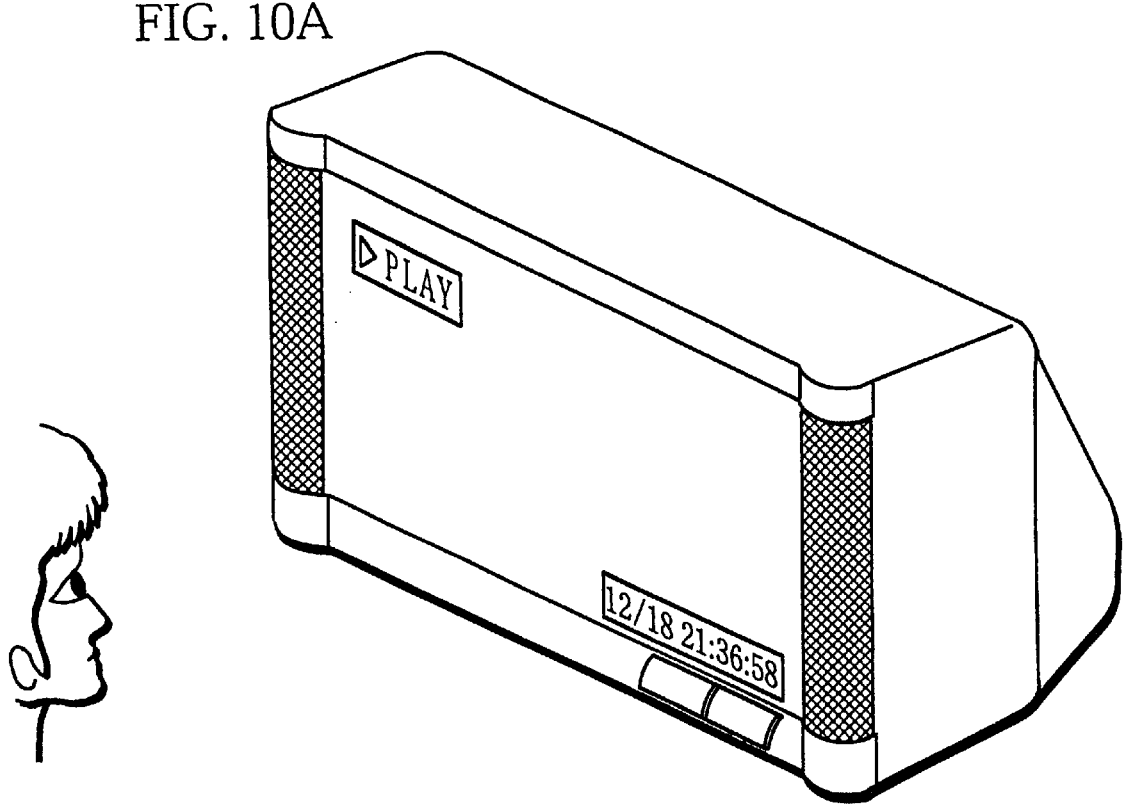
FIG. 10A shows a screen of a display apparatus.
Figure 10B:
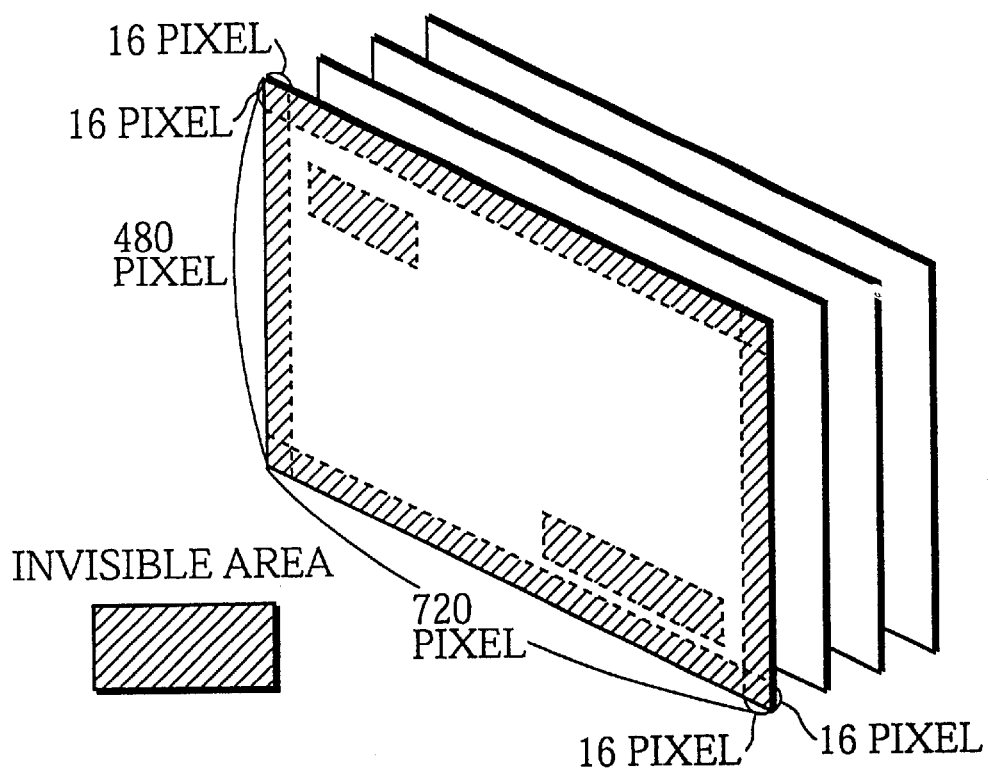
FIG. 10B shows invisible areas that appear on the screen shown in FIG. 10A.

The following description is based on the assumption that video signals output from the AV decoder 21 are displayed on a display apparatus, as shown in FIG. 10A. In FIG. 10B, the former invisible areas (picture areas on which OSD data is overlaid) are picture areas on which OSDs "ΔPLAY" and "12/18 21:36:58" are overlaid; the latter invisible area (picture areas which are not displayed due to the display performance limitations) is the hatched outer area of the picture. As described above, the outer area of a picture is treated as an invisible area. This is because the outer area of a picture is blurred in many cases due to the display performance limitations of common TV sets. Image decoding apparatuses therefore generally avoid outputting picture data corresponding to the picture outer areas.

Commands in the OSD data include display coordinates and the height and width of the OSD, so that the coordinates and height and width of an invisible area caused by an OSD can be found from the values for the OSD.

Figure 11A:
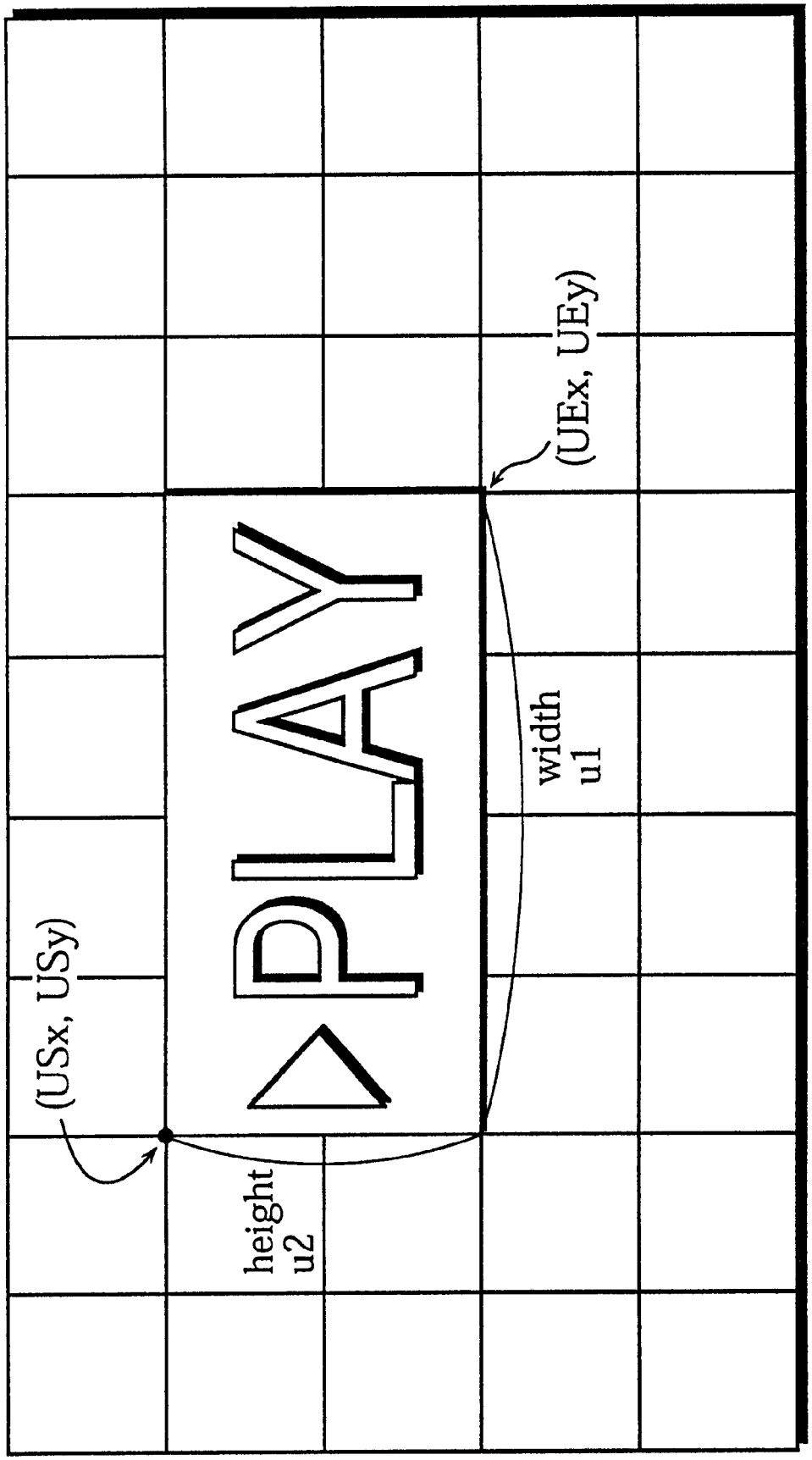
FIG. 11A shows an area onto which an OSD is overlaid.
Figure 11C:
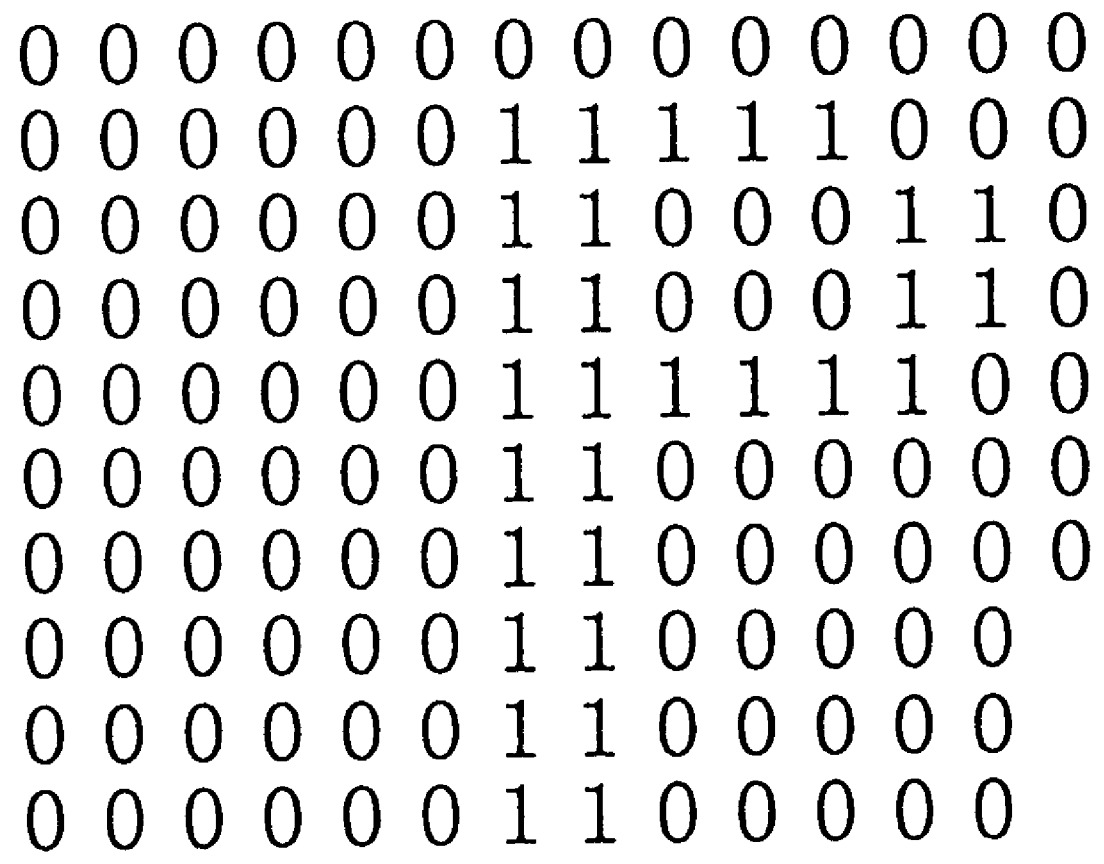

FIG. 11A shows an OSD representing a character sequence "ΔPLAY". FIG. 11B shows the invisible area which is generated when the OSD "ΔPLAY" is overlaid.

When the OSD "ΔPLAY" is displayed according to the coordinate (USx, USy) and the height and width of the OSD are respectively (height_u2, width_u1) as shown in FIG. 10A, the output picture management unit 61 holds the coordinates and the height and width as coordinate information of an invisible area. It should be noted here that in this embodiment, the size of OSD data is an integer multiple of a unit of 16 horizontal pixels by 16 vertical pixels and the smallest manageable unit of an invisible area is set to one macroblock.

The on-demand type area reservation unit 62 receives an instruction to reserve an OSD data storage area from the host microcomputer 23 and then reserves the OSD data storage area in a frame memory. The OSD data storage area can be a frame memory area corresponding to the invisible area due to the overlay of an OSD or a frame memory area corresponding to the invisible area due to the display performance limitations. The on-demand type area reservation unit 62 allocates the corresponding frame memory areas as the OSD data storage area. As a result, the OSD data storage area is reserved in the memory that is used for decode processing without using an additional memory.

The following is a detailed description of a picture data area on which an OSD is overlaid. As described above, there are transparent OSDs and non-transparent OSDs. The host microcomputer 23 informs the on-demand type area reservation unit 62 whether OSD data represents a transparent OSD or a non-transparent OSD. The on-demand type area reservation unit 62 manages a free area using different management methods according to whether the OSD data represents a transparent OSD or a non-transparent OSD.

Among picture data, neither luminance data nor chrominance data in a picture area on which a non-transparent OSD is overlaid is displayed on a screen. Consequently, the frame memory area storing this luminance data and chrominance data is managed as a free area.

On the other hand, when a transparent OSD is overlaid, the on-demand type area reservation unit 62 manages only a frame memory area that is assigned to store chrominance data in a picture area on which the transparent OSD is overlaid as a free area. The following is a description of the reason why the on-demand type area reservation unit 62 reduces only chrominance data when a transparent OSD is overlaid. Eyes of human beings can distinctly recognize luminance data that represents edges even if a transparent OSD is overlaid. On the other hand, humans cannot recognize colors accurately when the OSD is overlaid. Therefore, data for colors is not so important and the picture area onto which the OSD is overlaid may even be displayed in monochrome without appearing strange to the operator.

For the following reasons, an OSD data storage area is reserved in free areas that are managed by the on-demand type area. While the data size of a macroblock is large and the macroblock needs to be stored in a successive memory area, the data size of OSD data is small and commands included in the OSD data do not need to be stored in a successive memory area. That is, OSD data can be stored in intermittent free areas. Therefore, intermittent free areas in a frame memory can sufficiently store OSD data.

Note that sub-pictures, such as subtitles, are also overlaid on moving pictures. However, display positions, display contents, and display sizes of sub-pictures change in time. A memory area for storing image data whose display position and size change in time is not suited to use as an OSD data storage area.

Also, frame memory areas in the frame memories 52 and 53 that correspond to an invisible area are not suited to use as an OSD data storage area. This is because invisible areas of I-pictures and P-pictures stored in the frame memories 52 and 53 are also referred to during decode processing and therefore the loss of I-picture and P-picture data in the invisible area lowers the performance of decode processing.

Furthermore, it is preferable that an OSD is removed during the display of an I-picture or P-picture and that the removal of an OSD is prohibited while a B-picture is being displayed.

The on-demand type area reservation unit 62 only generates and holds a frame memory internal free area management table on receiving an area reservation request signal that specifies the reservation of an OSD data storage area from the host microcomputer 23. In the frame memory internal free area management table, free area information showing the first address of each free area and the successive length of the free area are related to the position information of macroblocks that correspond to an invisible area. More specifically, the on-demand type area reservation unit 62 generates the macroblock location information according to the coordinate information and height and width of the invisible area stored in the output picture management unit 61, and registers the generated macroblock position information in the table. FIG. 12 shows an example of the frame memory internal free area management table. As can be seen from FIG. 12, the frame memory internal area management table includes a "macroblock position information" column and an "address information" column. In this example, macroblocks whose coordinates are (i0, j0)–(i44, j0) are placed in invisible areas and occupy a frame memory area which has page_addressY0 and is length 45×512 in size and a frame memory area which has page_addressC0 and is length 45×512 in size. The frame memory areas occupied by the macroblocks are reserved as an OSD data storage area.

It should be noted here that in this embodiment, an invisible area has a size of an integer multiple of the size of a macroblock and provides an OSD data storage area whose size is a half or a quarter the size of a page area.

Figure 14:
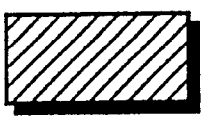
FIG. 14 shows a state where the first address of a free area is calculated from the location information of macroblocks.

The relations between the macroblock position information and addresses of free areas are described below with reference to FIG. 14. In FIG. 14, each square represents one macroblock and the hatched squares represent an invisible area. Location information (i, j) is assigned to each macroblock.

Macroblocks having location information (0, 0), (1, 0), (2, 0), (0, 1), (1, 1), and (2, 1) are located in the invisible area. When frame memory areas occupied by these macroblocks are regarded as a free area and the size of each page area storing macroblocks is 512 byte, the first address of a free area that corresponds to a macroblock having location information (i, j) in a frame memory is calculated from Formula 1 given below.

ADDij=row address+column address <Formula 1> where row address=512*i+α*(W/16)*512 bytes,
  column address=β*512 bytes,
  α=the integer part of j/Pnum,
  β=the decimal part of j/Pnum,
  W: the horizontal width of picture data (720 pixels),
  16: the number of pixels placed in one line of a macroblock,
  Pnum: the number of macroblocks that can be stored in a page area
    luminance data Pnum=2
    chrominance data Pnum=4, and
  i, j≧0.

A 256-byte frame memory area starting from the first address expressed by Formula 1 is used for storing luminance data and a 128-byte frame memory area starting from the first address expressed by Formula 1 is used for storing chrominance data.

It should be noted here that the methods disclosed by Japanese Laid-Open Patent Applications Nos. 6-189298 and 8-294115 are used to associate pixel coordinates to memory addresses. However, any other method may be used so long as coordinates of pixels on a screen are uniquely related to locations of pixel data of the pixels in a memory.

The OSD data access unit 63, on being instructed by the host microcomputer 23, writes the LUT and OSD data into one of a plurality of free areas managed by the on-demand type area reservation unit 62 and outputs the first address of the free area into which the LUT and OSD data are written and the data length of the LUT and OSD data to the host microcomputer 23. The host microcomputer 23 can therefore know which free area in the SD-RAM 22 stores the LUT and OSD data.

The OSD data access unit 63 receives an instruction to read OSD data, the first address of the free area from which the OSD data is read, and the length of the OSD data from the host microcomputer 23, and then reads the OSD data according to the received first address and the OSD data length.

The data reduction control unit 64 is instructed by the host microcomputer 23 to reserve an OSD data storage area. The data reduction control unit 64 discards macroblocks that are to be written into the OSD data storage area in the frame memory, out of the picture data of B-pictures. The data reduction control unit 64 continues this processing to prevent the OSD data stored in the OSD data storage area from being overwritten. Various methods can be used for discarding macroblocks, though the most efficient method for a picture decoding apparatus is to discard macroblocks that correspond to an invisible area before the macroblocks are decoded.

More specifically, the data reduction control unit 64 determines which one of an I-picture, a P-picture, and a B-picture is composed by picture data of a MPEG stream to be decoded, by referring to the PCT in the picture header of the picture data. When the picture data composes an I-picture or a P-picture, the data reduction control unit 64 transfers the picture data from the host buffer memory 102 to the encoded stream buffer area 51 as it is. When the picture data composes a B-picture, the data reduction control unit 64 determines which slice includes macroblocks that correspond to the invisible area by referring to the SSC included in each slice and the location information of the invisible area. Then the data reduction control unit 64 specifies macroblocks that correspond to the invisible area by referring to the MBAI included in each macroblock and the invisible area location information. The data reduction control unit 64 has the SD-RAM control unit 111 perform a DMA transfer to the encoded stream buffer area 51 on macroblocks that do not correspond to the invisible area. On the contrary, the data reduction control unit 64 does not have the SD-RAM control unit 111 perform the DMA transfer on macroblocks that correspond to the invisible area. As a result, the DMA transfer for macroblocks that correspond to the invisible area is omitted and these macroblocks are discarded in the host buffer memory 102.

Here, when the invisible area is an area on which an OSD is overlaid and the OSD is displayed transparently, the data reduction control unit 16 discards only chrominance data of macroblocks that correspond to the invisible area, out of macroblocks of a picture that is not referred to. Then, the data reduction control unit 16 has the SD-RAM control unit 111 transfer all luminance data from the host buffer memory 102 to the encoded stream buffer area 51.

For instance, in the case of the invisible area shown in FIG. 11B, the data reduction control unit 64 waits for macroblocks MB152, MB153, MB154, and MB155 to be input into the host buffer memory 102. After these macroblocks are input into the host buffer memory 102, the data reduction control unit 64 discards the macroblocks in the host buffer memory 102, and has the SD-RAM control unit 111 perform the DMA transfer to successively store macroblocks MB150 and MB151 that precede the discarded macroblocks and macroblocks MB156, MB157, and MB158 that succeed the discarded macroblocks in the encoded stream buffer area 51, as shown by the second level in FIG. 15. While the first level in FIG. 15 includes macroblocks MB150–MB158, the second level in FIG. 15 includes macroblocks MB150, MB151, and MB156–158. As can be seen from this drawing, the encoded stream buffer area 51 in the SD-RAM 22 stores a macroblock sequence from which macroblocks MB152–MB155 have been extracted.

As described above, macroblocks that correspond to an invisible area are discarded before the corresponding macroblocks are output from the host buffer memory 102. By doing so, the number of macroblocks to be decoded is reduced. Therefore, the decoding load on the code conversion unit 105 and the pixel calculation unit 106 is reduced. Also, the data amount transferred by DMA transfers between the host buffer memory 102 and the SD-RAM 22, between the SD-RAM 22 and the bitstream FIFO 103, and between the SD-RAM 22 and the motion compensation processing unit 107 is reduced during decode processing. Furthermore, the number of DMA transfers is reduced during decode processing. As a result, since the load of decode processing performed by the image decoding apparatus is reduced, the amount of consumption of electricity is reduced. Also, since the transfer data amount and the number of DMA transfers necessary for decode processing are reduced, other DMA transfers, such as the DMA transfer necessary for writing a LUT and OSD data input from the outside into the SD-RAM 22, are performed at high speed. Furthermore, the emission of electromagnetic wave from an image decoding apparatus is reduced.

It should be noted here that in this embodiment, the function for analyzing macroblock headers and slice headers is assigned to the I/O processor 113, and the data reduction control unit 64 in the I/O processor 113 detects macroblocks that correspond to invisible areas in the host buffer memory 102. However, this analysis function is ordinarily assigned to the code conversion unit 105. When it is not preferable to assign this analysis function to the I/O processor 113, the code conversion unit 105 may detect and discard macroblocks that correspond to invisible areas in the bitstream FIFO 103.

The motion compensation processing unit 65 reads picture data from the frame memories 52 and 53, performs half-pel processing on the read picture data, averages results of the half-pel processing, and performs motion compensation by adding a value output from the pixel calculation unit 106 to the averaging result. Then, the motion compensation processing unit 65 outputs the result of the motion compensation to the decoded pixel writing unit 66.

The decoded pixel writing unit 66 includes an address pointer that shows the first address of a page area into which picture data is written. The decoded pixel writing unit 66 sequentially writes each decoded macroblock output from the motion compensation processing unit 65 into a page area according to the address pointer. FIG. 16A shows a state where the decoded pixel writing unit 66 writes luminance data into a frame memory.

The decoded pixel writing unit 66 writes luminance data of two macroblocks MB0 and MB45 that are vertically located on a screen into a frame memory in the order indicated by the arrows (0), (1), (2), (3), . . . , (29), (30), and (31). Similarly, the decoded pixel writing unit 66 writes luminance data of two macroblocks MB1 and MB46 that are vertically located on the screen into the frame memory in the order indicated by the arrows (32), (33), (34), (35), . . . , (61), (62), and (63). The decoded pixel writing unit 66 has the SD-RAM control unit 111 perform a DMA transfer that is called the linear addressing mode to write the luminance data into the frame memory. Here, the linear addressing mode refers to an address increment method where the address pointer is sequentially incremented.

It should be noted here that after the macroblock which immediately precedes macroblocks that correspond to an invisible area is stored in a page area, the decoded pixel writing unit 66 increments the address pointer according to the size of the page areas assigned to the corresponding macroblocks and writes the macroblock which immediately succeeds the corresponding macroblocks into a page area according to the incremented address pointer. More specifically, to store macroblocks that do not correspond to an invisible area into a page area, the decoded pixel writing unit 66 writes macroblocks that precede macroblocks that correspond to an invisible area into the page area by sequentially incrementing the address pointer. After a macroblock which immediately proceeds the corresponding macroblocks is written into a page area, the decoded pixel writing unit 66 increments the address pointer so that the address pointer gives the first address of a page area into which a macroblock that immediately succeeds the corresponding macroblocks is to be written. Then, the decoded pixel writing unit 66 restarts to sequentially increment the address pointer.

The fourth level in FIG. 15 shows the page areas P150–P158 which are respectively assigned to the macroblocks MB150, MB151, MB152, MB153, . . . , MB157, and MB158.

After the macroblock MB150 in the second level is read and is written into the page area P150, the address pointer is incremented so that the address pointer gives the first address of the page area P151. After the macroblock MB151 which immediately precedes the macroblocks MB152–MB155 that correspond to an invisible area is output and written into the page area P151, the address pointer is incremented so that the address pointer gives the first address of the page area P156. Then the decoded pixel writing unit 66 resumes incrementing the address pointer. By doing so, the page areas P152–P155 in the non-reference picture data frame memory 54 for storing the macroblocks MB152–MB155 are reserved as a free area, as shown in the fourth level in FIG. 15. This free area is used as an OSD data storage area.

Note that when the sth macroblock in horizontal direction (s≧0) is written into a page area, the offset for the sth macroblock is determined according to the number of macroblocks located between the macroblock at the left end of a screen and the sth macroblock. Because the size of each page area is 512 bytes, the sth macroblock is written into a page area starting from the first address obtained by adding (512)×s bytes to the first address of the line including the sth macroblock.

The display line reading unit 67 transfers pixel data in line units from frame memories to the video output unit 108 through the line buffer memory 140. To do so, the display line reading unit 67 includes a reading pointer showing from which page area pixel data is to be read. The display line reading unit 67 reads pixel data in line units from page areas by incrementing the reading pointer. FIG. 16B shows a state where the display line reading unit 67 reads pixel data. As shown in this drawing, the first line of pixel data of the macroblocks MB0–MB44 is read in the order shown by the arrows (0)–(44). The second line of pixel data in the macroblocks MB0–MB44 is read in the order shown by the arrows (45)–(89), and the third line of pixel data in the macroblocks MB0–MB44 is read in the order shown by the arrows (90)–(134). To do so, the display line reading unit 67 has the SD-RAM control unit 111 perform a DMA transfer that is called the video out mode. Here, the video out mode refers to an address increment method where the reading pointer is sequentially incremented and a 512-byte offset is added to the reading pointer in 16-byte units.

In this embodiment, especially note that an OSD data storage area is reserved in a frame memory area in the non-reference data frame memory 53 that corresponds to an invisible area.

Here, when OSD data represents an OSD that is displayed non-transparently (the OSD data of the mixture ratio α=100%), the decoded picture data in the invisible area is blended with the OSD data at the ratio of 0%:100%. Therefore, the filters of the video output unit 108 manipulate the decoded picture data so that the decoded picture data is not displayed. In some cases, parts of the decoded picture data remain in the OSD data storage area that is reserved in a frame memory. However, the remaining parts of the pixel data are blended with OSD data at the mixture ratio a of 0%:100%. Therefore, the remaining parts do not affect the output video signal and troublesome situations where the remaining parts are displayed on a screen can be avoided. Consequently, even if all data in one line is read from a frame memory area including the OSD data storage area without eliminating the remaining parts, unwanted data is not displayed on the screen.

In the case where OSD data represents a transparent OSD, after pixel data in a line is read from a macroblock which immediately proceeds macroblocks that correspond to an invisible area, the display line reading unit 67 increments the reading pointer to skip the OSD data storage area that corresponds to the invisible area in a frame memory area. At the same time, the display line reading unit 67 provides monochrome data or gray-scale data for the line buffer memory 140. More specifically, when pixel data in a line that includes pieces of pixel data corresponding to an invisible area is to be read, pixel data that precedes the corresponding pieces of pixel data is read. Then pixel data that succeeds the corresponding pieces of pixel data is read, with monochrome data or gray-scale data being provided to the line buffer memory 140 that is assigned to chrominance data corresponding to the invisible area.

The following description concerns an example of the processing of the display line reading unit 67, with reference to FIG. 15. The fourth level in FIG. 15 shows a state where the page areas P150 and P151 store the macroblocks MB150 and MB151 and the page areas P156–P158 store the macroblocks MB156–MB158. The page areas P152–P155 are used as an OSD data storage area.

When pixel data in a line is read from the page areas P150–P158, pixel data in the line of the macroblocks MB150 and MB151 is first read from the page areas P150 and P151. Then, the pointer is incremented to the first address of the page area P156. Finally, pixel data in the line of the macroblocks MB156–MB158 is read from the page areas P156–P158, with the display line reading unit 67 providing monochrome data or gray-scale data to an area in the line buffer memory 140 that is assigned to chrominance data corresponding to the invisible area.

As a result, as can be seen from the fifth level in FIG. 15, the line buffer memory 140 stores monochrome data or gray-scale data for the invisible area.

The following is a description of the processing of the data reduction control unit 64, the decoded pixel writing unit 66, and the display line reading unit 67, with reference to flowcharts.

The processing of the data reduction control unit 64 is described below with reference to the flowchart in FIG. 17.

The data reduction control unit 64 waits for a picture header to be stored in the host buffer memory 102 in step S1. When a picture header is stored in the host buffer memory 102, the process proceeds to step S2. In step S2, the data reduction control unit 64 judges whether the stored picture header corresponds to a B-picture. When the stored picture header corresponds to a I-picture or a P-picture, the process proceeds to step S3. In step S3, the data reduction control unit 64 transfers picture data which has been sequentially accumulated in the host buffer memory 102 to the encoded stream buffer area 51, and releases the area in the host buffer memory 102 that was occupied by the transferred picture data. Then, the process returns to step S1 and the data reduction control unit 64 waits for another picture header to be stored in the host buffer memory 102. When a piece of a stream is newly input from the outside after the processing in step S3, the data reduction control unit 64 writes the newly input stream piece into the released area in the host buffer memory 102.

When the data reduction control unit 64 judges that the picture header stored in the host buffer memory 102 corresponds to a B-picture in step S2, the process proceeds to step S13. In step S13, the process enters a loop and the first slice among a plurality of slices in the B-picture is selected as a target of the first loop. The first loop includes steps S4–S12, S17, and S18. The first slice selected in step S13 is processed in steps S4–12, S17, and S18.

In step S4, the data reduction control unit 64 detects the slice header of the first slice of the B-picture stored in the host buffer memory 102. In step S5, the data reduction control unit 64 judges whether the SSC of the detected slice header corresponds to an invisible area. When the judgement result is negative, the process proceeds to step S6. In step S6, the data reduction control unit 64 transfers the slice having the detected slice header from the host buffer 102 to the encoded stream buffer area 51. In step S7, the data reduction control unit 64 releases an area in the host buffer memory 102 that was occupied by the transferred slice. Then the processing proceeds to step S14.

When the data reduction control unit 64 judges that the SSC of the detected slice header corresponds to an invisible area, the processing proceeds to step S15.

In steps S15, the processing enters the second loop and the first macroblock among a plurality of macroblocks in the slice selected in step S13 is set as a target of the second loop. In the second loop, the processing in steps S8–S12, S17, and S18 is repeated. The macroblock set as the target of the second loop in step S15 is processed in steps S8–12, S17, and S18.

In step S8, the data reduction control unit 64 detects the macroblock header of the set macroblock in the host buffer memory 102. In step S9, the data reduction control unit 64 judges whether the MBAI of the detected macroblock header corresponds to the invisible area. When the judgement result is negative, the process proceeds to step S10. In step S10, the data reduction control unit 64 transfers the set macroblock from the host buffer memory 102 to the encoded stream buffer area 51. In step S11, the data reduction control unit 64 releases an area in the host buffer memory 102 that was occupied by the transferred macroblock. Then the processing proceeds to step S16.

When the judgement result in step S9 is affirmative, the processing proceeds to step S17. In step S17, the data reduction control unit 64 judges whether a transparent OSD is displayed in the invisible area. When the judgement result is negative, the process skips step S18 and proceeds to step S12. When the judgement result is affirmative, the process proceeds to step S18. In step 18, the data reduction control unit 64 transfers only luminance data of the macroblock corresponding to the invisible area from the host buffer memory 102 to the encoded stream buffer area 51.

In step S12, the data reduction control unit 64 releases an area in the host buffer memory 102 that has been occupied by the set macroblock without transferring the set macroblock from the host buffer memory 102 to the encoded stream buffer area 51. Then the processing proceeds to step S16.

In S16, a conditional branch to step S15 is performed. The condition of the conditional branch is that all macroblocks have not been selected in step S15. When the condition is satisfied, the process branches to step S15 to select the next macroblock in the slice. When the condition is not satisfied, the processing proceeds to step S14.

In S14, a conditional branch to step S13 is performed. The condition of the conditional branch is that all slices have not been selected in step S13. When the condition is satisfied, the process branches to step S13 to select the next slice of the picture data. When the condition is not satisfied, the process proceeds to step S1. With these conditional branches, all slices included in the picture data that has been judged as composing a B-picture in step S2 are processed in steps S4–S12, S15, S17, and S18. When the processing returns to step S1, the data reduction control unit 64 waits for another picture header to be stored in the host buffer memory 102.

Figure 18A:
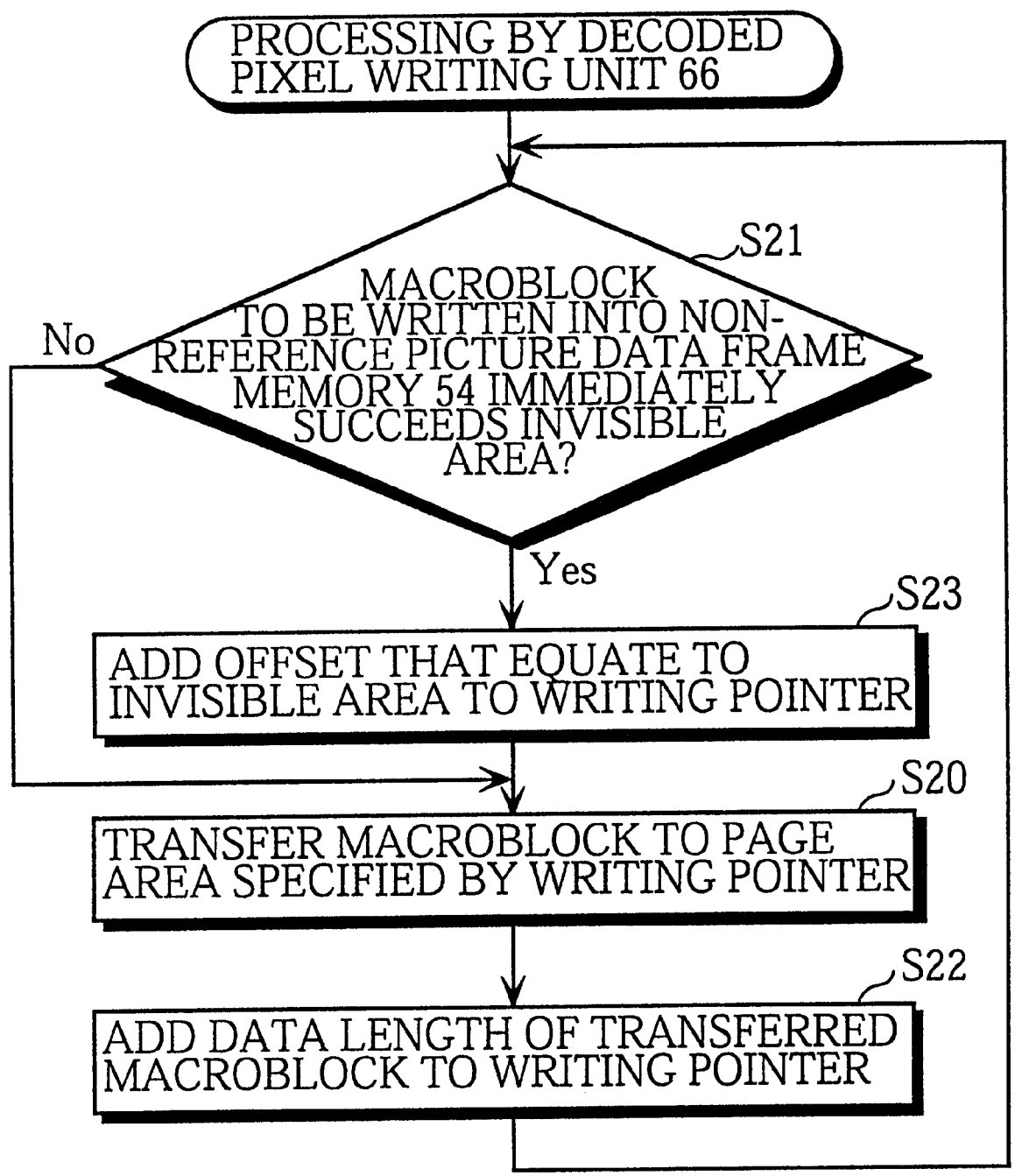
FIG. 18A is a flowchart showing the processing of the decoded pixel writing unit 66.

The following is a description of the processing of the decoded pixel writing unit 66, with reference to the flowchart shown in FIG. 18A. In step S21, the decoded pixel writing unit 66 judges whether the next macroblock to be written into the reference picture data B frame memory 53 immediately succeeds an invisible area. When the judgement result is negative, the decoded pixel writing unit 66 transfers the next macroblock to the page area specified by the writing pointer in step S20. Then the decoded pixel writing unit 66 adds the value of a predetermined offset to the value of the writing pointer in step S22. The predetermined offset gives a data amount that the writing pointer should skip to store the macroblock following the next macroblock into a page area. The value of the predetermined offset equates to the data amount of one macroblock.

When the judgement result in step S21 is affirmative, the decoded pixel writing unit 66 adds an offset corresponding to the size of the invisible area to the value of the writing pointer in steps S23.

Figure 18B:
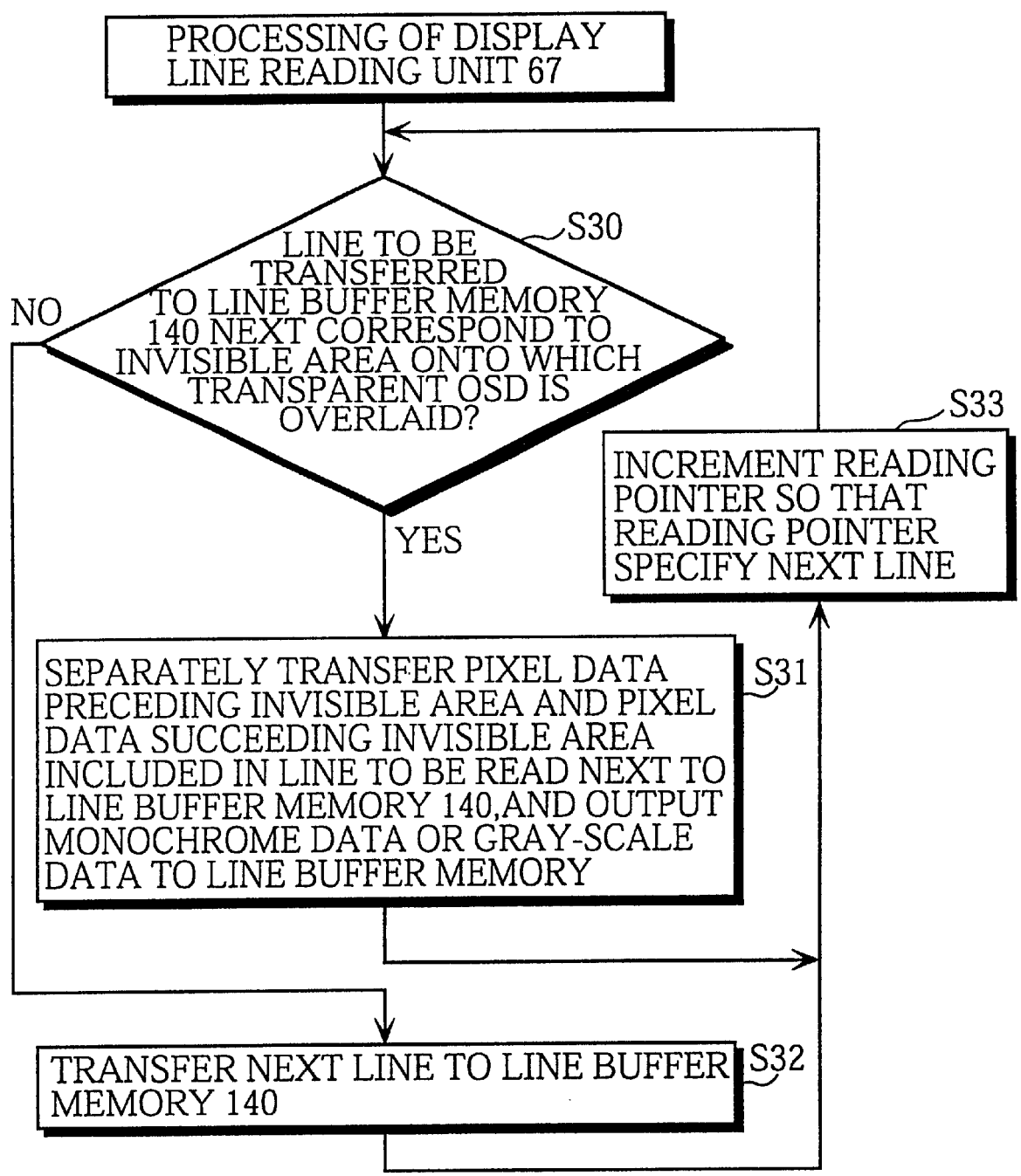
FIG. 18B is a flowchart showing the processing of the display line reading unit 67.

The following description concerns the processing of the display line reading unit 67 in the case where an OSD data storage area stores OSD data that represents a transparent OSD, with reference to the flowchart shown in FIG. 18B. In step S30, the display line reading unit 67 judges whether the line specified by the reading pointer, which is to say the next line to be transferred to the line buffer memory 140, corresponds to an invisible area onto which the transparent OSD is overlaid. When the judgement result is negative, the display line reading unit 67 transfers the specified line to the line buffer memory 140, increments the reading pointer to the line following the transferred line, and performs the processing in step S32. When the judgement result is affirmative, the processing proceeds to step S31. In step S31, the display line reading unit 67 separately transfers pixel data preceding the invisible area and pixel data succeeding the invisible area among pixel data in the next line to the line buffer memory. At the same time, the display line reading unit 67 outputs monochrome data or gray-scale data to the line buffer memory 140 instead of chrominance data stored in the frame memory area that corresponds to the OSD data storage area.

As described above, the picture decoding apparatus of the present embodiment discards the pixel data in an invisible area corresponding to an OSD, only when an operator has input an instruction to display an OSD. Therefore, a work area is reserved without degrading the picture quality, and the AV decoder 21 can display the OSD without using an additional memory.

Also, when an OSD data storage area is reserved, the size of non-decoded MPEG stream is reduced. Therefore, the load of decode processing and the amount of consumption of electricity are reduced. Also, the decode processing and other processing associated with DMA transfers, such as the processing for writing OSD data, are performed at high speed.

In this embodiment, the data reduction control unit 64 discards pixel data that corresponds to an invisible area. However, the corresponding pixel data may be discarded after the code conversion unit 105 and the pixel calculation unit 106 decode the corresponding pixel data.

Also, in this embodiment, the size of picture data of a B-picture is reduced. However, picture data of any picture that is not referred to during the decode processing may be reduced in size.

Embodiment 2

In Embodiment 1, the frame memory areas that correspond to invisible areas are managed as intermittent free areas. In Embodiment 2, the free areas are filled with data. The following description based on the assumption that a frame memory stores a plurality of macroblocks (1)–(16) and the memory area following the frame memory stores data A–L, as shown in FIG. 19A.

Figure 19B:
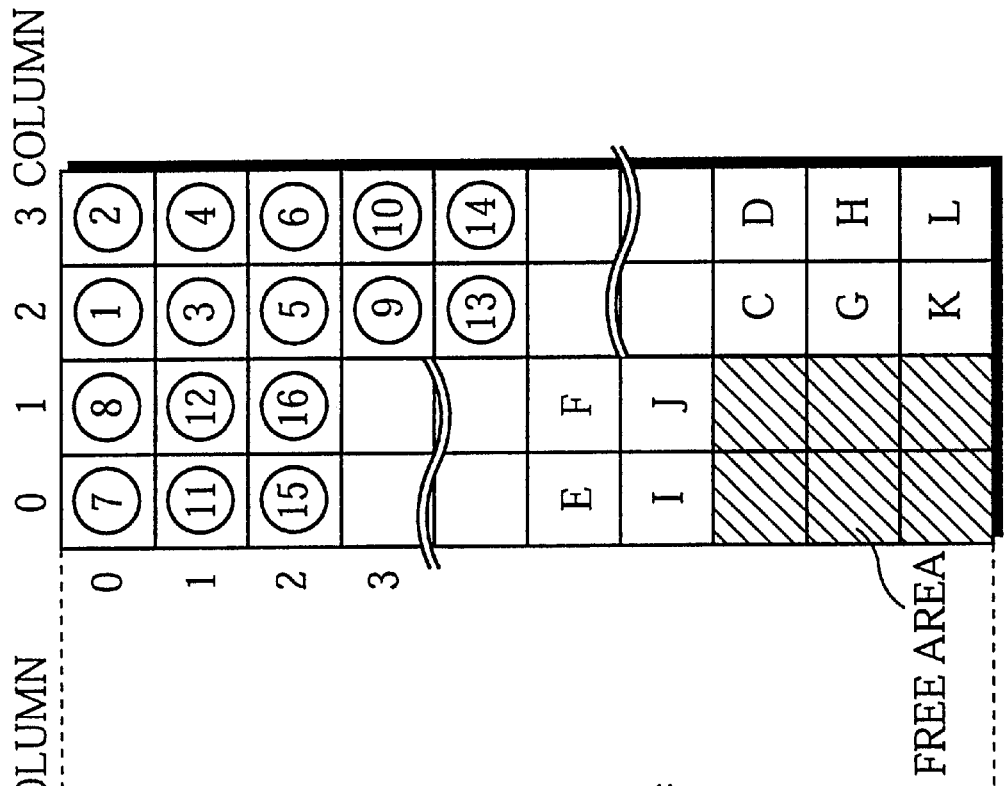
FIG. 19B shows a state where a free area is reserved in the area below the areas occupied by data I and J and at the left of the areas occupied by data C, D, G, H, K, and L.
Figure 19A:
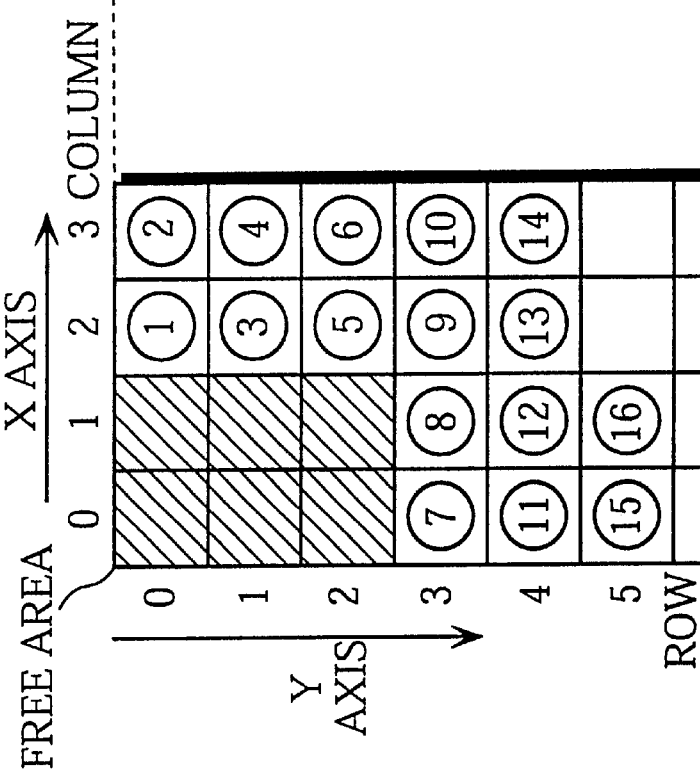
FIG. 19A shows a frame memory that stores a plurality of macroblocks (1)–(16) and a memory area that succeeds the frame memory and stores data A–L.

The hatched area in FIG. 19A represents a free area. The macroblocks (7), (11), and (15) located in the areas whose coordinates are (0, 3), (0, 4), and (0, 5) on the x and y coordinate axes and the macroblocks (8), (12), and (16) located in the areas whose coordinates are (1, 3), (1, 4), and (1, 5) on the x and y coordinate axes are shifted so that these macroblocks fill the free area. Consequently, the free area is reserved in the area below the areas occupied by data I and J and at the left of the areas occupied by data C, D, G, H, K, and L, as shown in FIG. 19B.

When the number of macroblocks which are located in an invisible area and are ith from the top and 0 to j-ith from the left end is set to Nij, the storage address ADDij in the SD-RAM for storing the macroblocks is calculated from Formula 2 given below.

ADDij=row address+column address <Formula 2> where row address=$512*i+\alpha*(W/16)*512$ bytes, column address=$\beta*512$ bytes, W: the horizontal width of picture data (720 pixels), $\alpha$={the integer part of (j-Nij)/Pnum)}, $\beta$={the decimal part of (j-Nij)/Pnum)}, i, j≧0, Nij≦j, Pnum: the number of macroblocks that can be stored in a page area, luminance data Pnum=2, and chrominance data Pnum=4.

The following is a description of the calculation method of a reading address used to display picture data. Here, x coordinate axis is set in the rightward direction and y coordinate axis is set in the downward direction on a screen.

Macroblocks in the 1st–3rd rows on the screen, that is pixel data in 1st–48th pixel rows on the screen, are read according to the reading address that is obtained by adding an offset concerning the x coordinate and an offset concerning the y coordinate to the first address of the frame memory.

Among macroblocks in the 4nd and latter rows on the screen, that is pixel data in 49th and latter pixel rows, pixel data in the 0–31st pixel columns on the screen and pixel data in the 32nd and latter pixel columns are read according to reading addresses that are obtained from different calculations.

The reading address for pixel data in 0–31st pixel columns is obtained by adding an offset concerning the x coordinate and an offset of (y coordinate-the number of unnecessary macroblocks*16) to the first address of the frame memory.

The reading address for pixel data in 32nd and latter pixel columns is obtained by adding an offset concerning the x coordinate and an offset concerning the y coordinate to the first address of the frame memory.

In the present embodiment, free areas that are separately present in a frame memory are combined, so that a large OSD data storage area is reserved in the frame memory.

Embodiment 3

In Embodiment 1, the size of an invisible area is set to an integer multiple of the size of a macroblock and an OSD data storage area is obtained in units of a half or a quarter of a page area. In Embodiment 3, the size. of the invisible area can be set at will.

Therefore, three types of free areas shown in FIGS. 20A, 20B, and 20C are obtained in this embodiment. These free areas are described below.

(Type 1)

A free area of Type 1 has a size of a multiple of 256 bytes or 128 bytes and is obtained when the whole of a macroblock corresponds to an invisible area as shown in FIG. 20A.

(Type 2)

A free area of Type 2 has a size of 16 bytes*the number of lines and is obtained when some lines of a macroblock correspond to an invisible area as shown in FIG. 20B.

(Type 3)

A free area of Type 3 is discrete and is obtained when a part of each line of a macroblock corresponds to an invisible area as shown in FIG. 20C.

The free area of Type 3 includes separate areas which are each below 16 bytes in size. Therefore, it is difficult to use the free area of Type 3 as an OSD data storage area. Accordingly, the free areas of Type 1 and Type 2 are used as OSD data storage areas in this embodiment.

The following is a description of the construction of the AV decoder 21 of this embodiment. The data reduction control unit 64 and the decoded pixel writing unit 66 of the AV decoder 21 of this embodiment are modified as described below.

The data reduction control unit 64 detects macroblocks that entirely correspond to an invisible area as shown in FIG. 20A by referring to the coordinate information of the invisible area, the SSC included in a slice, and the MBAIs included in macroblocks, and discards the detected macroblocks, in the same manner as the data reduction control unit 64 of Embodiment 1. Also, the data reduction control unit 64 detects macroblocks that correspond to the invisible area in part as shown in FIG. 20B, and sends location information of the detected macroblocks to the decoded pixel data writing unit 66.

The decoded pixel data writing unit 66 writes decoded macroblocks into reference picture data frame memories in the same manner as the decoded pixel data writing unit 66 of Embodiment 1. Also, the decoded pixel data writing unit 66 performs special processing for writing the detected macroblocks according to the sent location information.

The special processing is described below with reference to FIGS. 20D, 21A, and 21B. Here, the following description is based on the assumption that macroblocks correspond to an invisible area, as shown in FIG. 20D. In this drawing, while A area includes macroblocks that entirely correspond to the invisible area, B and C areas include macroblocks that correspond to the invisible area in part.

Figures 21A, 21B:
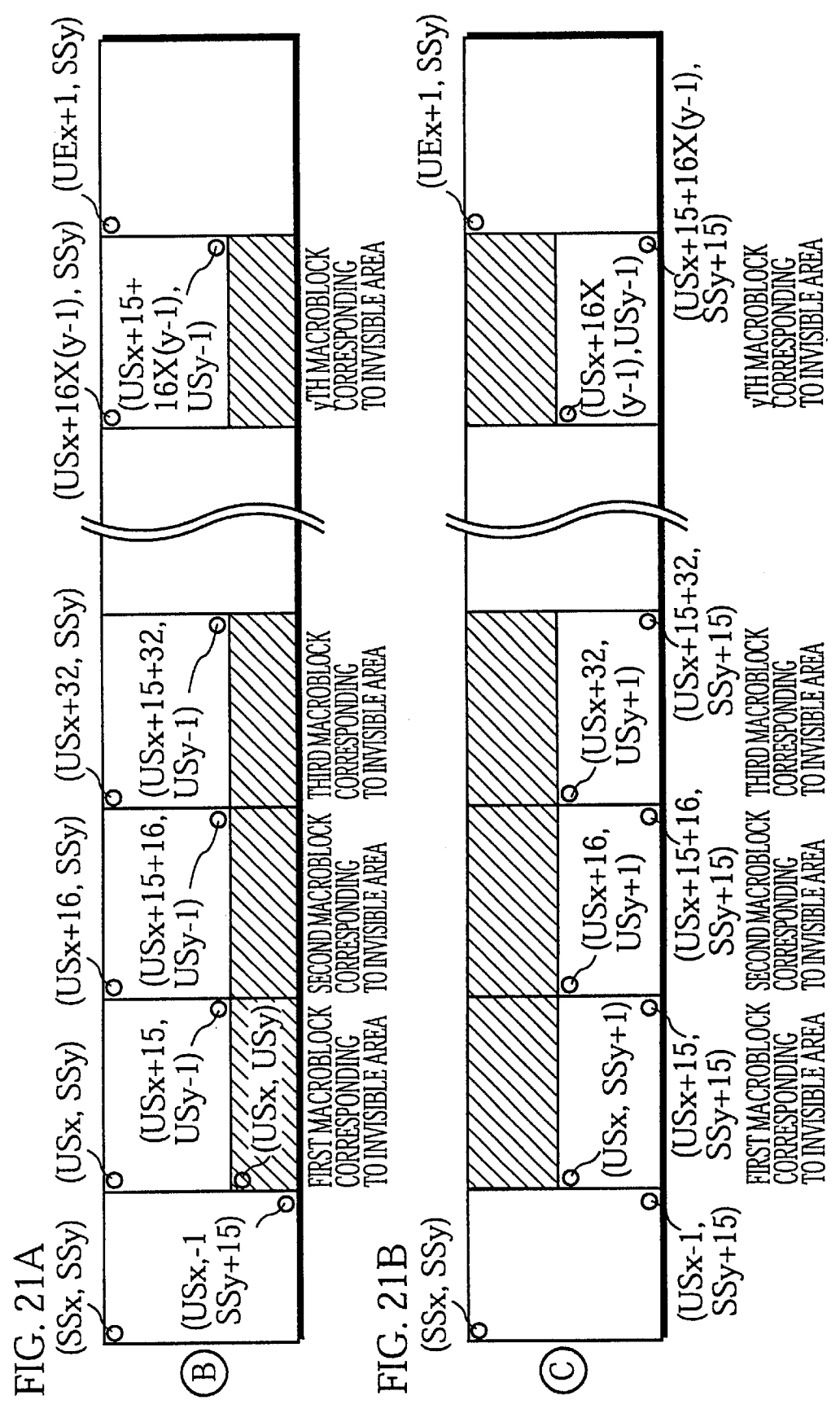

FIGS. 21A and 21B show a state where the macroblocks in B and C areas in FIG. 20D are written into a frame memory.

The following is a description of the process that the macroblocks in B area shown in FIG. 21A is written into the non-reference picture data frame memory 54. In FIG. 21A, the upper left coordinate is set at (SSx, SSy).

The SD-RAM control unit 111 performs a DMA transfer to write macroblocks located between the leading coordinate of the slice (SSx, SSy) and the coordinate immediately preceding the invisible area (USx−1, SSy+15) into the non-reference picture data frame memory 54.

The SD-RAM control unit 111 performs a DMA transfer to write pixel data located between the upper left coordinate (USx, SSy) and the coordinate (USx+15, USy−1) that immediately precedes the invisible area into the frame memory 54, out of the first macroblock that corresponds to the invisible area.

The SD-RAM control unit 111 performs a DMA transfer to write pixel data located between the upper left coordinate (USx+16, SSy) and the coordinate (USx+15+16, USy−1) that immediately precedes the invisible area into the frame memory 54, out of the second macroblock that corresponds to the invisible area. The SD-RAM control unit 111 performs a DMA transfer to write pixel data located between the upper left coordinate (USx+32, SSy) and the coordinate (USx+15+32, USy−1) that immediately precedes the invisible area into the frame memory 54, out of the third macroblock that corresponds to the invisible area. The SD-RAM control unit 111 performs a DMA transfer to write pixel data located between the upper left coordinate (USx+16*(y−1), SSy) and the coordinate (USx+15+16*(y−1), USy−1) that immediately precedes the invisible area into the frame memory 54, out of the yth macroblock that corresponds to the invisible area.

The SD-RAM control unit 111 performs a DMA transfer to write pixel data located between the coordinate (UEx+1, SSy) that immediately succeeds the invisible area and the last coordinate of the slice into the frame memory 54.

The following is a description of the process that the macroblocks in C area shown in FIG. 21B is written into the non-reference picture data frame memory 54. In FIG. 21B, the upper left coordinate is set at (SSx, SSy).

The SD-RAM control unit 111 performs a DMA transfer to write macroblocks located between the leading coordinate of the slice (SSx, SSy) and the coordinate immediately preceding the invisible area (USx-1, SSy+15) into the non-reference picture data frame memory 54.

The SD-RAM control unit 111 performs a DMA transfer to write pixel data located between the coordinate (USx, SSy+1) that immediately succeeds the invisible area and the last coordinate (USx+15, SSy+15) into the frame memory 54, out of the first macroblock that corresponds to the invisible area.

The SD-RAM control unit 111 performs a DMA transfer on the second, third, and yth macroblocks that correspond to the invisible area. As a result, pixel data located between the coordinate (USx+16, USy+1) and the coordinate (USx+15+16, SSy+15), pixel data located between the coordinate (USx+32, USy+1) and the coordinate (USx+15+32, SSy+15), and pixel data located between the coordinate (USx+16*(y−1), USy+1) and the coordinate (USx+15+16*(y−1), SSy+15) are written into the frame memory 54.

The SD-RAM control unit 111 performs a DMA transfer to write pixel data located between the coordinate (UEx+1, SSy) that immediately succeeds the invisible area and the last coordinate of the slice into the frame memory 54.

The following is a description of the processing for reading pixel data according to the video out mode. The frame memory areas that correspond to an invisible area store data other than the pixel data of macroblocks. Therefore, data is not read from the corresponding frame memory areas in the same manner as non-corresponding frame memory areas. That is, the SD-RAM control unit 111 performs a DMA transfer according to the video out mode so that the corresponding frame memory areas are skipped.

FIG. 22 shows a state where pixel data is read from A, B, and C areas in FIG. 20D. The pixel data in the line that does not correspond to the invisible area is read sequentially. However, the pixel data that immediately precede the invisible area and the pixel data that immediately succeed the invisible area are separately read. More specifically, the SD-RAM control unit 111 performs the DMA transfer on pixel data from the first coordinate of the slice (SSx, USy) to the coordinate (UEx−1, USy) that immediately precedes the invisible area. Then, the SD-RAM control unit 111 performs the DMA transfer on pixel data from the coordinate (UEx+1, USy) that immediately succeeds the invisible area to the last coordinate of the slice (SEx, USy).

It should be noted here that as Embodiment 1, free areas may be reserved in frame memory areas (at addresses) that correspond to the invisible area. Also, as Embodiment 2, free areas that are separately present in the frame memory may be filled with pixel data stored in the frame memory area that does not correspond to the invisible area. In this case, a large, continuous free area is reserved.

As described above, in the present embodiment, frame memory areas that each correspond to the invisible area but are smaller than the size of a macroblock are used as an OSD data storage area. As a result, a large OSD data storage area is reserved.

The processing of the data reduction control unit 64, the motion compensation processing unit 65, and the decoded pixel writing unit 66 (the processing in the flowcharts in FIGS. 17, 18A, and 18B) may be achieved by machine programs and the machine programs may be distributed and sold using recording media, such as IC cards, optical disks, and floppy disks. The machine programs are installed into general-purpose computers and the general-purpose computers achieve the functions of the picture decoding apparatus of the present invention by executing the machine programs.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. An image decoding apparatus which decodes pieces of picture data included in a video stream according to an instruction from a host apparatus and writes the decoded pieces of picture data into a storage apparatus, wherein each piece of picture data is of one of a plurality of picture types which are each related to one of different encoding methods, and the storage apparatus includes a plurality of frame areas for storing most recently decoded pieces of picture data separately according to the plurality of picture types, the image decoding apparatus comprising:

a decoding means for decoding pieces of picture data included in the video stream one at a time while referring to decoded picture data in at least one of the plurality of frame areas;

a writing means for writing a newly decoded piece of picture data over a piece of picture data in one of the plurality of frame areas, an area allocation means for allocating, on receiving a reservation request to reserve a work area in the storage apparatus from the host apparatus, a region in one of the plurality of frame areas as the work area, wherein the region should store either of
 (1) a certain part of a piece of picture data of a predetermined picture type that is yet to be decoded by the decoding means, and
 (2) a certain part of a decoded piece of picture data of the predetermined picture type that is yet to be written by the writing means.

2. The image decoding apparatus of claim 1, wherein the host apparatus outputs the reservation request and host data to be written into the storage apparatus to the image decoding apparatus, each piece of picture data includes a plurality of pieces of pixel data for one frame, and the area allocation means includes:

an area storage unit for storing area location information showing a location of a predetermined area on a screen;

a prohibition unit for prohibiting one of
- (3) decoding of pixel data that corresponds to the predetermined area, the corresponding pixel data being included in picture data of the predetermined type, and
- (4) writing of pixel data that corresponds to the predetermined area, the corresponding pixel data being included in a decoded piece of picture data of the predetermined type; and a first writing unit for writing the host data into the allocated region.

3. The image decoding apparatus of claim 2, wherein the host apparatus continuously outputs the reservation request for a predetermined period, and while the reservation request is being outputted from the host apparatus, the prohibition unit continuously prohibits one of
- (3) the decoding of the corresponding pixel data that is included in the picture data of the predetermined type, and
- (4) the writing of the corresponding pixel data that is included in the decoded piece of the picture data of the predetermined type.

4. The image decoding apparatus of claim 3, wherein the area storage unit stores the area location information showing an outer area of the screen.

5. The image decoding apparatus of claim 3, wherein the host apparatus starts to output the reservation request when on-screen display data is to be written into the work area, the host apparatus outputs the on-screen display data as the host data with the reservation request, and the area storage unit stores the area location information showing an area of the screen where the on-screen display data is displayed.

6. The image decoding apparatus of claim 5, wherein the on-screen display data includes image data to be overlaid on an image displayed on the screen, vertical and horizontal sizes of the on-screen display data in a case where the on-screen display data is expanded on the screen, and coordinate information showing coordinates of the on-screen display data on the screen, the host apparatus outputs the vertical and horizontal sizes and the coordinate information with the reservation request to the area allocation means, and the area allocation means further includes:
a location information calculating unit for calculating the area location information according to the vertical and horizontal sizes and the coordinate information outputted from the host apparatus, and writing the calculated area location information into the area storage unit.

7. The image decoding apparatus of claim 6, wherein the on-screen display data is displayed on the screen either transparently and non-transparently, each piece of picture data written into the plurality of frame areas includes luminance data and chrominance data for one frame, the area allocation means further includes:
an area specifying unit for performing the following operation (5) when the on-screen display data is displayed transparently, and performing the following operation (6) when the on-screen display data is displayed non-transparently;
- (5) a specifying of a region of one of the plurality of frame areas that should store chrominance data corresponding to the on-screen display data, the corresponding chrominance data being included in picture data of the predetermined type; and
- (6) a specifying of regions of one of the plurality of frame areas that should store luminance data and chrominance data corresponding to the on-screen display data, the corresponding luminance data and chrominance data being included in picture data of the predetermined type, the first writing unit writes the on-screen display data into the regions specified by the areas specifying unit, and the image decoding apparatus further comprising:
a horizontal reading means for sequentially reading pixel data in each line of the screen from one of the plurality of frame areas;

a conversion means for converting the read pixel data into an image signal; and an image data supplying means for supplying, when the read pixel data corresponds to the on-screen display which is to be displayed transparently, predetermined data to the conversion means, instead of chrominance data of the read pixel data.

8. The image decoding apparatus of claim 7, wherein when a line of pixel data to be read next corresponds to the predetermined area, the horizontal reading means sequentially reads at least one of pixel data that should be located before the predetermined area and pixel data that should be located after the predetermined area.

9. The image decoding apparatus of claim 3, wherein each piece of picture data includes a plurality of pieces of slice data, each piece of slice data including a slice header and pixel data of m pixel rows by n pixel columns (here, m and n are integers no less than one), the slice header showing a location of a corresponding piece of slice data on the screen, the image decoding apparatus further comprising:
a buffer memory for sequentially storing the plurality of pieces of slice data input from the outside;

a transfer means for sequentially transferring the plurality of pieces of slice data from the buffer memory to the decoding means, the area allocation means further includes:
a first detection unit for detecting each piece of slice data whose location shown by a corresponding slice header corresponds to the predetermined area, and the prohibition unit controls the transfer means so that a piece of slice data that should be located immediately before the predetermined area and a piece of slice data that should be located immediately after the predetermined area are successively transferred from the buffer memory to the decoding means.

10. The image decoding apparatus of claim 9, wherein each piece of slice data includes a plurality of macroblocks, each macroblock includes a macroblock header and pixel data of s pixel rows by t pixel columns (here, s and t are integers no less than one, where $S \leq m$ and $t \leq n$), the macroblock header showing a location of a corresponding macroblock on the screen, and the area allocation means further includes:
- a second detection unit for detecting each macroblock whose location on the screen shown by a corresponding macroblock header corresponds to the predetermined area, and
- the prohibition unit controls the transfer means so that a macroblock that should be located immediately before the predetermined area and a macroblock that should be located immediately after the predetermined area are successively transferred from the buffer memory to the decoding means.

11. The image decoding apparatus of claim 10, wherein the writing means includes:
- a pointer holding means for holding a storage address pointer showing where a newly decoded macroblock should be stored;
- a second writing unit for writing, after the decoding means decodes a macroblock, the decoded macroblock into one of the plurality of frame areas according to the storage address pointer; and
- an incrementor for adding an offset that equates to a data length of the written macroblock to a value of the storage address pointer.

12. The image decoding apparatus of claim 11, wherein the transfer means transfers a macroblock that should be located immediately before the predetermined area and a macroblock that should be located immediately after the predetermined area to the decoding means, the incrementor adds an offset that equates to a data length of the predetermined area to the value of the storage address pointer when a macroblock to be stored next should be located immediately after the predetermined area, and the second writing unit writes the macroblock to be stored next into one of the plurality of frame areas according to the storage address pointer.

13. The image decoding apparatus of claim 12, wherein the prohibition unit controls, when a macroblock decoded by the decoding means is included in picture data of the predetermined type and includes pixel data that corresponds to the predetermined area, the writing means to sequentially write at least one of pixel data that should be located before the predetermined area and pixel data that should be located after the predetermined area, the pixel data being included in the decoded macroblock, into one of the plurality of frame areas that should store the picture data of the predetermined picture type.

14. The image decoding apparatus of claim 3, wherein picture data of the predetermined picture type has been encoded according to an intra-frame bidirectionally predictive method.

15. The image decoding apparatus of claim 3, wherein the prohibition unit controls, when a piece of picture data of the predetermined type is newly decoded by the decoding means and includes pixel data that corresponds to the predetermined area, the writing means to sequentially write at least one of pixel data that should be located before the predetermined area and pixel data that should be located after the predetermined area, the pixel data being included in the newly decoded piece of picture data, into one of the plurality of frame area that should store the picture data of the predetermined picture type.

16. A computer-readable recording medium for recording an image decoding program for decoding pieces of picture data included in a video stream according to an instruction from a host apparatus and writing the decoded pieces of picture data into a storage apparatus, wherein each piece of picture data is of one of a plurality of picture types which are each related to one of different encoding methods, and the storage apparatus includes a plurality of frame areas for storing most recently decoded pieces of picture data separately according to the plurality of picture types, the image decoding program comprising:
- a decoding step for decoding pieces of picture data included in the video stream one at a time while referring to decoded picture data in at least one of the plurality of frame areas;
- a writing step for writing a newly decoded piece of picture data over a piece of picture data in one of the plurality of frame areas,
- an area allocation step for allocating, when the host apparatus outputs a reservation request to reserve a work area in the storage apparatus, a region in one of the plurality of frame areas as the work area, wherein the region should store either of
- (1) a certain part of a piece of picture data of a predetermined picture type that is yet to be decoded in the decoding step, and
- (2) a certain part of a decoded piece of picture data of the predetermined picture type that is yet to be written in the writing step.

17. The computer-readable recording medium of claim 16, wherein the host apparatus outputs the reservation request and host data to be written into the storage apparatus, each piece of picture data includes a plurality of pieces of pixel data for one frame, and the area allocation step includes:
- a prohibition substep for prohibiting one of
    - (3) decoding of pixel data that corresponds to a predetermined area on a screen, the corresponding pixel data being included in picture data of the predetermined type, and
    - (4) writing of pixel data that corresponds to the predetermined area, the corresponding pixel data being included in a decoded piece of picture data of the predetermined type; and
- a first writing substep for writing the host data into the allocated region.

18. The computer-readable recording medium of claim 17, wherein the host apparatus continuously outputs the reservation request for a predetermined period, and in the prohibition substep, while the reservation request is being outputted from the host apparatus, either of (3) the decoding of the corresponding pixel data that is included in the picture data of the predetermined type, and (4) the writing of the corresponding pixel data that is included in the decoded piece of the picture data of the predetermined type is prohibited.

19. The computer-readable recording medium of claim 18, wherein the predetermined area is an outer area of the screen.

20. The computer readable recording medium of claim 18, wherein the host apparatus starts to output the reservation request when on-screen display data is to be written into the work area, the host apparatus outputs the on-screen display data as the host data with the reservation request, and the predetermined area is an area of the screen where the on-screen display data is displayed.

21. The computer-readable recording medium of claim 20,
wherein the on-screen display data includes image data to be overlaid on an image displayed on the screen, vertical and horizontal sizes of the on-screen display data in a case where the on-screen display data is expanded on the screen, and coordinate information showing coordinates of the on-screen display data on the screen,
the host apparatus outputs the vertical and horizontal sizes and the coordinate information with the reservation request for allocation in the area allocation step, and
the area allocation step further includes:
a location information calculating substep for calculating area location information showing a location of the predetermined area according to the vertical and horizontal sizes and the coordinate information outputted from the host apparatus.

22. The computer-readable recording medium of claim 21,
wherein the on-screen display data is displayed on the screen either transparently or non-transparently,
each piece of picture data written into the plurality of frame areas includes luminance data and chrominance data for one frame,
the area allocation step further includes:
an area specifying substep for performing the following operation (5) when the on-screen display data is displayed transparently, and performing the following operation (6) when the on-screen display data is displayed non-transparently:
(5) a specifying of a region of one of the plurality of frame areas that should store chrominance data corresponding to the on-screen display data, the corresponding chrominance data being included in picture data of the predetermined type; and
(6) a specifying of regions of one of the plurality of frame areas that should store luminance data and chrominance data corresponding to the on-screen display data, the corresponding luminance data and chrominance data being included in picture data of the predetermined type,
in the first writing substep, the on-screen display data is written into the regions specified in the area specifying substep, and
the image decoding program further comprising:
a horizontal reading step for sequentially reading pixel data in each line of the screen from one of the plurality of frame areas;
conversion step for converting the read pixel data into an image signal; and
an image data supplying step for supplying, when the read pixel data corresponds to the on-screen display which is to be displayed transparently, predetermined data for conversion in the conversion step, instead of chrominance of the read pixel data.

23. The computer-readable recording medium of claim 22,
wherein when a line of pixel data to be read next corresponds to the predetermined area, at least one of pixel data that should be located before the predetermined area and pixel data that should be located after the predetermined area is sequentially read in the horizontal reading step.

24. The computer-readable recording medium of claim 18,
wherein each piece of picture data includes a plurality of pieces of slice data, each piece of slice data including a slice header and pixel data of m pixel rows by n pixel columns (here, m and n are integers no less than one), the slice header showing a location of a corresponding piece of slice data on the screen,
a computer for reading the image decoding program includes:
a buffer memory for sequentially storing the plurality of pieces of slice data input from the outside,
the image decoding program further comprising:
a transfer step for sequentially transferring the plurality of pieces of slice data from the buffer memory for decoding in the decoding step,
the area allocation step further includes:
a first detection substep for detecting each piece of slice data whose location shown by a corresponding slice header corresponds to the predetermined area, and
the prohibition substep controls the transfer step so that a piece of slice data that should be located immediately before the predetermined area and a piece of slice data that should be located immediately after the predetermined area are successively transferred from the buffer memory to the decoding step.

25. The computer-readable recording medium of claim 24,
wherein each piece of slice data includes a plurality of macroblocks,
each macroblock includes a macroblock header and pixel data of s pixel rows by t pixel columns (here, s and t are integers no less than one, where $S \leqq m$ and $t \leqq n$), the macroblock header showing a location of a corresponding macroblock on the screen, and
the area allocation step further includes:
a second detection step for detecting each macroblock whose location on the screen shown by a corresponding macroblock header corresponds to the predetermined area, and
the prohibition substep controls the transfer step so that a macroblock that should be located immediately before the predetermined area and a macroblock that should be located immediately after the predetermined area are successively transferred from the buffer memory for the decoding in the decoding step.

26. The computer-readable recording medium of claim 25,
wherein the computer further includes:
a pointer holding means for holding a storage address pointer showing where a newly decoded macroblock should be stored, and
the image decoding program further comprises:
a second writing substep for writing, after a macroblock is decoded in the decoding step, the decoded macroblock into one of the plurality of frame areas according to the storage address pointer; and
an increment substep for adding an offset to a value of the storage address pointer, the offset equates to a data length of a macroblock that has been written into one of the plurality of frame areas according to the storage address pointer.

27. The computer-readable recording medium of claim 26,
- wherein in the transfer step, a macroblock that should be located immediately before the predetermined area and a macroblock that should be located immediately after the predetermined area are transferred for the decoding in the decoding step,
- in the increment substep, an offset that equates to a data length of the predetermined area is added to the value of the storage address pointer when a macroblock to be stored next should be located immediately after the predetermined area, and
- in the second writing substep, the macroblock to be stored next is written into one of the plurality of frame areas according to the storage address pointer.

28. The computer-readable recording medium of claim 27,
- wherein the prohibition substep controls, when a macroblock decoded in the decoding step is included in picture data of the predetermined type and includes pixel data that corresponds to the predetermined area, the writing step to sequentially write at least one of pixel data that should be located before the predetermined area and pixel data that should be located after the predetermined area, the pixel data being included in the decoded macroblock, into one of the plurality of frame areas that should store the picture data of the predetermined picture type.

29. The computer-readable recording medium of claim 28,
- wherein picture data of the predetermined picture type has been encoded according to an intra-frame bidirectionally predictive method.

30. The computer-readable recording medium of claim 28,
- wherein the prohibition substep controls, when a piece of picture data of the predetermined type is newly decoded in the decoding step and includes pixel data that corresponds to the predetermined area, the writing step to sequentially write at least one of pixel data that should be located before the predetermined area and pixel data that should be located after the predetermined area, the pixel data being included in the newly decoded piece of picture data, into one of the plurality of frame area that should store the picture data of the predetermined picture type.

* * * * *